US012786894B2

(12) United States Patent
Knudsen et al.

(10) Patent No.: US 12,786,894 B2
(45) Date of Patent: Nov. 3, 2026

(54) INSERTION LOSS MITIGATION FOR REFERENCE SIGNALING

(71) Applicant: Nokia Technologies Oy, Espoo (FI)

(72) Inventors: Knud Knudsen, Aalborg (DK); Samantha Caporal Del Barrio, Aalborg (DK); Benny Vejlgaard, Aalborg (DK); Juha Pekka Karjalainen, Oulu (FI); Pasi Eino Tapio Kinnunen, Oulu (FI); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 280 days.

(21) Appl. No.: 18/689,743

(22) PCT Filed: Sep. 23, 2022

(86) PCT No.: PCT/EP2022/076468

§ 371 (c)(1),
(2) Date: Mar. 6, 2024

(87) PCT Pub. No.: WO2023/052253

PCT Pub. Date: Apr. 6, 2023

(65) Prior Publication Data

US 2024/0397446 A1 Nov. 28, 2024

(30) Foreign Application Priority Data

Oct. 1, 2021 (EP) .................................... 21200435

(51) Int. Cl.

| | |
|---|---|
| ***H04W 52/36*** | (2009.01) |
| ***H04L 5/00*** | (2006.01) |
| ***H04W 72/21*** | (2023.01) |

(52) U.S. Cl.

CPC ......... *H04W 52/365* (2013.01); *H04L 5/0048* (2013.01); *H04W 72/21* (2023.01)

(58) Field of Classification Search

CPC . H04W 52/365; H04W 72/21; H04W 52/146; H04W 52/367; H04W 52/325; H04L 5/0048; H04L 5/0023

See application file for complete search history.

(56) References Cited

U.S. PATENT DOCUMENTS

2010/0255790 A1 * 10/2010 Farajidana ........... H04B 7/0695 455/69
2014/0226551 A1 * 8/2014 Ouchi ................. H04W 52/244 370/311

(Continued)

FOREIGN PATENT DOCUMENTS

WO WO-2021031028 A1 * 2/2021 .......... H04W 52/325

OTHER PUBLICATIONS

Office action received for corresponding European Patent Application No. 21200435.2, dated May 27, 2024, 5 pages.

(Continued)

*Primary Examiner* — Tejis Daya
(74) *Attorney, Agent, or Firm* — Lippes Mathias LLP

(57) ABSTRACT

Disclosed is inter alia a user equipment, comprising means for: —receiving, from a network node, a first configuration for at least one uplink reference signal to be transmitted through at least one respective antenna port of the user equipment, wherein the first configuration comprises a first set of resource blocks over which the at least one uplink reference signal is to be transmitted; —determining whether sufficient power headroom is available at the user equipment to compensate for at least one first insertion loss to be incurred within the user equipment by the at least one respective uplink reference signal transmitted according to the first configuration; —if it is determined that sufficient power headroom to compensate for the at least one first insertion loss is not available, transmitting, to the network node, a re-configuration request for the at least one uplink (Continued)

reference signal; —receiving, from the network node in response to the re-configuration request, a second configuration for the at least one uplink reference signal associated with a second set of resource blocks over which the at least one uplink reference signal is to be transmitted; and —transmitting, to the network node, the at least one uplink reference signal according to the second configuration through the at least one respective antenna port.

17 Claims, 9 Drawing Sheets

(56) References Cited

U.S. PATENT DOCUMENTS

| | | | | |
|---|---|---|---|---|
| 2015/0222402 | A1* | 8/2015 | Ouchi | H04W 72/21 370/329 |
| 2019/0123864 | A1 | 4/2019 | Zhang et al. | |
| 2019/0349066 | A1* | 11/2019 | Yang | H04B 7/0697 |
| 2020/0351674 | A1* | 11/2020 | Zhou | H04W 72/21 |
| 2022/0014313 | A1* | 1/2022 | Elshafie | H04W 72/51 |
| 2023/0055394 | A1* | 2/2023 | Elshafie | H04B 7/0608 |

OTHER PUBLICATIONS

"3rd Generation Partnership Project; Technical Specification Group Radio Access Network; NR; Physical layer procedures for data (Release 16)", 3GPP TS 38.214, V16.6.0, Jun. 2021, pp. 1-172.
"3rd Generation Partnership Project; Technical Specification Group Radio Access Network; NR; Medium Access Control (MAC) protocol specification (Release 16)", 3GPP TS 38.321, V16.5.0, Jun. 2021, pp. 1-157.
"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.
"New WID: Further enhancements on MIMO for NR", 3GPP TSG RAN Meeting #86, RP-193133, Agenda: 9.1.1, Samsung, Dec. 9-12, 2019, 5 pages.
"Further discussion on additional IL caused by SRS switch", 3GPP TSG-RAN WG4 Meeting #88bis, R4-1812719, Agenda: 7.6.10.6, OPPO, Oct. 8-12, 2018, 7 pages.
"SRS Switching loss impact to system performance", 3GPP TSG-RAN WG4 Meeting #88Bis, R4-1813468, Agenda: 7.6.3.2, Qualcomm Incorporated, Sep. 8-12, 2018, 2 pages.
"Discussion on additional IL caused by SRS switch", 3GPP TSG-RAN WG4 Meeting #88, R4-1810553, Agenda: 7.6.5.1, OPPO, Aug. 20-24, 2018, 5 pages.
"Discussion on SRS enhancement", 3GPP TSG-RAN WG1 Meeting #104bis-e, R1-2103155, Agenda: 8.1.3, Qualcomm Incorporated, Apr. 12-20, 2021, 28 pages.
Finnish Application No. 20215033, "Uplink Sounding Configuration Signalling", filed on Jan. 13, 2021, pp. 1-44.
"Msc-generator", Sourceforge, Retrieved on Mar. 1, 2024, Webpage available at : https://sourceforge.net/projects/msc-generator/.
"3rd Generation Partnership Project; Technical Specification Group Radio Access Network; NR; Physical layer procedures for control (Release 16)", 3GPP TS 38.213, V16.6.0, Jun. 2021, pp. 1-187.
"WF on FeMIMO impacts to RF requirements", 3GPP TSG-RAN WG4 Meeting # 100-e, R4-2114994, Agenda: 9.19.1, Samsung, Aug. 16-27, 2021, 3 pages.
"FL summary #1 on SRS enhancements", 3GPP TSG RAN WG1 Meeting #106-e, R1-2108217, Agenda: 8.1.3, ZTE, Aug. 16-27, 2021, 59 pages.
"3rd Generation Partnership Project; Technical Specification Group Radio Access Network; NR; Physical channels and modulation (Release 16)", 3GPP TS 38.211, V16.7.0, Sep. 2021, pp. 1-134.
Extended European Search Report received for corresponding European Patent Application No. 21200435.2, dated Mar. 23, 2022, 9 pages.
"Discussion on SRS enhancement", 3GPP TSG-RAN WG1 Meeting #104-e, R1-2101451, Agenda: 8.1.3, Qualcomm Incorporated, Jan. 25-Feb. 5, 2021, 41 pages.
"SRS Hopping", 3GPP TSG-RAN WG4 Meeting NR ad-hoc #3, R4-1709833, Agenda: 3.3.3.10, Qualcomm Incorporated, Sep. 18-21, 2017, pp. 1-5.
International Search Report and Written Opinion received for corresponding Patent Cooperation Treaty Application No. PCT/EP2022/076468, dated Jan. 16, 2023, 12 pages.
Office action received for corresponding European Patent Application No. 21200435.2, dated Apr. 16, 2025, 3 pages.

* cited by examiner

INSERTION LOSS MITIGATION FOR REFERENCE SIGNALING

RELATED APPLICATION

This application was originally filed as PCT Application No. PCT/EP2022/076468 on Sep. 23, 2022, which claims priority from EP Application Serial No. 21200435.2, filed on Oct. 1, 2021, each of which is incorporated herein by reference in its entirety.

TECHNICAL FIELD

Various example embodiments according to the present disclosure relate to communication networks, such as wireless radio networks comprising base stations and mobile devices, such as user equipment, communicating with each other, or mobile devices communicating with each other. Specifically, various example embodiments according to the present disclosure relate to uplink reference signals as for example transmitted by a user equipment for channel estimations and other purposes.

BACKGROUND

Various example embodiments according to the present disclosure are related but not limited to communication networks as defined by the 3GPP standard, such as the 5G standard, also referred to as New Radio (NR).

5G NR makes extensive use of beamforming, in both uplink (UL) and downlink (DL). In particular, the multiple-input and multiple-output (MIMO) concept is used for multiplying the capacity of a radio link using multiple transmission and receiving antennas to exploit multipath propagation. As for example user equipments (UEs) and base stations (gNBs) are equipped with multiple antenna elements or antenna arrays, the transmitted signal can be focused efficiently on intended targets.

Uplink reference signals such as for example sounding reference signals (SRS) are signals that may be transmitted by a UE and used for channel estimations, UL/DL beam selection, modulation coding scheme (MCS) selection, link adaption, and other scenarios. Considering for example a UE with multiple antennas (e.g. a main antenna TRX for transmitting and receiving and additional pure RX antennas), transmitting a reference signal through only one particular antenna may lead to the gNB inaccurately estimating the channel status for the other antennas, hence resulting in DL MIMO performance degradation for these antennas. This issue may be addressed by switching the reference signal transmission among the multiple antennas of the UE (the pure RX antennas temporarily acting as TX antennas).

In view of a typical UE architecture with for example only a subset of the antennas being TRX antennas and the rest being RX antennas, switching the output of the TRX antenna power amplifier (PA) to the different pure RX antennas may yield a higher insertion loss (e.g. caused by switching components and RF cables), especially for the RX antennas located further away from the PA. Furthermore, the insertion loss may for example increase with the frequency of the operating band. The resulting power difference among the transmitted reference signals may impact the channel sounding done by the gNB and thereby reduce the performance and throughput of DL transmissions.

SRS insertion loss reporting has been suggested to compensate for insertion loss due to SRS antenna switching for up to 8 RX antennas. However, this solution does not take dynamic path loss on the secondary RX antennas into account. Furthermore, the SRS sounding may still be transmitted with different power levels for the different antennas depending on their insertion loss. Even if the gNB knows the insertion loss, it cannot avoid that the signal-to-noise ratio of the received SRS signals may be worse for the antennas with high insertion loss. Eventually, this may degrade the channel sounding and reduce the throughput experienced by the user.

SUMMARY OF SOME EXEMPLARY EMBODIMENTS

Various example embodiments according to the present disclosure may have the effect of providing a framework for the transmission of reference signals. Specifically, certain exemplary embodiments according to the present disclosure may address the mitigation of insertion loss that occurs when transmitting reference signals by a UE.

According to a first exemplary aspect a user equipment is disclosed, comprising means for:

- receiving, from a network node, a first configuration for at least one uplink reference signal to be transmitted through at least one respective antenna port of the user equipment, wherein the first configuration comprises a first set of resource blocks over which the at least one uplink reference signal is to be transmitted;
- determining whether sufficient power headroom is available at the user equipment to compensate for at least one first insertion loss to be incurred within the user equipment by the at least one respective uplink reference signal transmitted according to the first configuration;
- if it is determined that sufficient power headroom to compensate for the at least one first insertion loss is not available, transmitting, to the network node, a re-configuration request for the at least one uplink reference signal;
- receiving, from the network node in response to the re-configuration request, a second configuration for the at least one uplink reference signal associated with a second set of resource blocks over which the at least one uplink reference signal is to be transmitted; and
- transmitting, to the network node, the at least one uplink reference signal according to the second configuration through the at least one respective antenna port.

According to the first exemplary aspect, a method, performed at least by a user equipment, is also disclosed, the method comprising:

- receiving, from a network node, a first configuration for at least one uplink reference signal to be transmitted through at least one respective antenna port of the user equipment, wherein the first configuration comprises a first set of resource blocks over which the at least one uplink reference signal is to be transmitted;
- determining whether sufficient power headroom is available at the user equipment to compensate for at least one first insertion loss to be incurred within the user equipment by the at least one respective uplink reference signal transmitted according to the first configuration;
- if it is determined that sufficient power headroom to compensate for the at least one first insertion loss is not available, transmitting, to the network node, a re-configuration request for the at least one uplink reference signal;
- receiving, from the network node in response to the re-configuration request, a second configuration for the at least one uplink reference signal associated with a second set of resource blocks over which the at least one uplink reference signal is to be transmitted; and transmitting, to the network node, the at least one uplink reference signal according to the second configuration through the at least one respective antenna port.

According to a second exemplary aspect, a network node is disclosed, comprising means for:

transmitting, to a user equipment, a first configuration for at least one uplink reference signal to be transmitted through at least one respective antenna port of the user equipment, wherein the first configuration comprises a first set of resource blocks over which the at least one uplink reference signal is to be transmitted;

receiving, from the user equipment, a re-configuration request for the at least one uplink reference signal, if it is determined by the user equipment that sufficient power headroom to compensate for at least one first insertion loss to be incurred within the user equipment by the at least one respective uplink reference signal transmitted according to the first configuration is not available at the user equipment;

transmitting, to the user equipment in response to the re-configuration request, a second configuration for the at least one uplink reference signal associated with a second set of resource blocks over which the at least one uplink reference signal is to be transmitted; and receiving, from the user equipment, the at least one uplink reference signal transmitted according to the second configuration through the at least one respective antenna port.

According to the second exemplary aspect, a method, performed at least by a network node, is also disclosed, the method comprising:

transmitting, to a user equipment, a first configuration for at least one uplink reference signal to be transmitted through at least one respective antenna port of the user equipment, wherein the first configuration comprises a first set of resource blocks over which the at least one uplink reference signal is to be transmitted;

receiving, from the user equipment, a re-configuration request for the at least one uplink reference signal, if it is determined by the user equipment that sufficient power headroom to compensate for at least one first insertion loss to be incurred within the user equipment by the at least one respective uplink reference signal transmitted according to the first configuration is not available at the user equipment;

transmitting, to the user equipment in response to the re-configuration request, a second configuration for the at least one uplink reference signal associated with a second set of resource blocks over which the at least one uplink reference signal is to be transmitted; and receiving, from the user equipment, the at least one uplink reference signal transmitted according to the second configuration through the at least one respective antenna port.

The user equipment of the first exemplary aspect may be stationary device or a mobile device. The user equipment may in particular be a mobile device, such as a smart phone, a tablet, a wearable, a smartwatch, a low power device, an IoT device or the like. Generally, the user equipment may also be any other device enabled for communication with a respective communication network, such as a vehicle, for example a car. A user equipment or mobile station may be understood as any device used to communicate with a respective network. The user equipment of the first exemplary aspect may be in direct or indirect communication with a network node of the communication network, such as a network node of the second exemplary aspect, or another user equipment.

The network node of the second exemplary aspect may be an electronic device, such as a node of the radio access network or the core network of a communication system. For example, the network node may be or comprise a base station (e.g. a gNodeB/gNB, eNodeB/eNB, BS, access node, access point, or the like) or be in communication with a base station. Generally, the network node may be a hardware and/or software component implementing a certain functionality. In an example, the network node may be a node as defined by the 3GPP 5G standard. Accordingly, while the network node may be understood to be implemented in or be a single device or module, the network node may also be implemented across or comprise multiple devices or modules. Multiple network nodes of the first exemplary aspect may in particular establish a communication system or network, which may in particular be an NR or 5G system or any other mobile communications system defined by a past or future standards, in particular successors of the present 3GPP standards. The network node of the second exemplary aspect may be in direct or indirect communication with the user equipment of the first exemplary aspect.

The means of any of the disclosed apparatuses can be implemented in hardware and/or software. They may comprise one or multiple modules or units providing the respective functionality. They may for example comprise at least one processor for executing computer program code for performing the required functions, at least one memory storing the program code, or both. Alternatively, they could comprise for example circuitry that is designed to implement the required functions, for example implemented in a chipset or a chip, like an integrated circuit. In general, the means may comprise for example one or more processing means or processors.

Thus, according to a respective exemplary aspect of the present disclosure, there is also disclosed a respective apparatus (i.e. a network node and a user equipment) comprising at least one processor and at least one memory including computer program code, the at least one memory and the computer program code configured to, with the at least one processor, cause an apparatus at least to perform and/or to control the method according to a respective exemplary aspect of the present disclosure.

Any of the above-disclosed apparatuses may be a module or a component for a device, for example a chip. The disclosed apparatus may comprise the disclosed components, for example means, processor, memory, or may further comprise one or more additional components.

The method of a respective aspect may for example be performed and/or controlled by the apparatus according to the respective aspect, i.e. network node or the user equipment, respectively. Generally, however, a respective method may also be performed and/or controlled by more than one apparatus, for example by a user equipment and a network node working together.

According to the first and second exemplary aspects of the present disclosure, there is in each case also disclosed a computer program, the computer program when executed by a processor of an apparatus causing said apparatus to perform a method according to the first or second exemplary aspect respectively.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for example a Read-Only Memory (ROM) or hard disk of a computer, or be intended for distribution of the program, like an optical disc.

There is also disclosed a system comprising a user equipment of the first exemplary aspect and a network node of the second exemplary aspect of the present disclosure.

The first configuration and the second configuration for at least one uplink reference signal may for example be understood as respective uplink reference signal configurations that are in particular transmitted from the network node to the user equipment via a higher layer signal, for example via the RRC layer or via a MAC control element. An uplink reference signal configuration may for example be a general configuration so that the user equipment receives a general configuration needed for transmitting one or multiple uplink reference signals. In another example, an uplink reference signal configuration may be a specific configuration for transmitting an uplink reference signal on a specific occasion. In yet another example, the uplink reference signal configuration may be a general configuration to be used on multiple occasions for multiple uplink reference signals (e.g. until another configuration is provided). For example, an uplink reference signal configuration may comprise or be associated with information such as resource information, port information and/or information on the resources to be used for transmitting an uplink reference signal, such as for example a set of resource blocks, a number of signal ports and/or a signal frequency density. As an example, an uplink reference signal may be configured by an uplink reference signal configuration (e.g. a first or second configuration) according to which the uplink reference signal (e.g. the least one uplink reference signal) may be transmitted, which then may be understood as uplink reference signal configuration (e.g. a first or second configuration) for the uplink reference signal (e.g. the least one uplink reference signal).

An uplink reference signal may for example be a sounding reference signal (SRS) that may be used for channel estimations, UL/DL beam-selection, MCS selection, link adaption, UL/DL communication, and other scenarios. An SRS may be understood as described in the 3GPP TS 38.211 with regard to the 5G standard. Considering for example an SRS as uplink reference signal, the SRS may be transmitted at the last symbol(s) of an uplink slot.

An uplink reference signal may for example be transmitted through a particular antenna port of the UE, which shall be understood to mean that the respective antenna port of the UE is used to transmit the uplink reference signal. For example, it may be specified in the configuration for the uplink reference signal which antenna port of the UE is to be used for transmitting the uplink reference signal. For example, a particular uplink reference signal may be seen as corresponding to a respective antenna port, such that this particular uplink reference signal may be used after transmission at a receiver to estimate the channel corresponding to the specific antenna port and to derive detailed channel-state information related to the specific antenna port. Considering an example wherein a UE may be equipped with multiple antennas (e.g. 2, 4, 6 or 8 antennas) and thus multiple antenna ports, multiple uplink reference signals (e.g. 2, 4, 6, or 8 signals) with each of them corresponding to a respective antenna port may be used to derive detailed channel-state information related to the respective antenna ports.

For example, an uplink reference signal may be transmitted over a particular set of resource blocks (e.g. a first or second set of resource blocks). Therein, the set of resource blocks may for example specify where in the time and frequency domain in the resource grid the uplink reference signal may be located and thus specify the frequency bandwidth (e.g. in terms of resource blocks) that is allocated to the uplink reference signal. For example, a set of resource blocks may be contained in an uplink reference signal configuration according to which an uplink reference signal is transmitted, which may be understood to mean that the uplink reference signal is transmitted over the set of resource blocks contained in the uplink reference signal configuration.

As an example with respect to 5G NR, a resource block (RB) is defined as a set of 12 contiguous sub-carriers in the frequency domain over one OFDM symbol, and a resource block represents the basic unit for scheduling radio resources for UL/DL communications (as e.g. further described in 3GPP TS 38.211, section 4.4.4.1). Other definitions for a resource block may be possible, for example by varying the number of contiguous sub-carriers and/or the number of OFDM symbols over which a resource block spans (such as e.g. in LTE, where a resource block is defined as 12 contiguous sub-carriers over 7 or 14 OFDM symbols, i.e. the slot and sub-frame duration respectively). In some examples, transmitting an uplink reference signal over a set of resource blocks may not necessarily imply that all sub-carriers of the resource blocks in the set of resource blocks are used for transmission, since the exact sub-carriers that carry the uplink reference signal are for example further defined based on a frequency offset and a frequency density according to an uplink reference signal configuration for the uplink reference signal.

Assuming that for example an uplink reference signal is to be transmitted according to an uplink reference signal configuration and thus over a set of resource blocks contained in the uplink reference signal configuration, a certain transmission power may be required (e.g. on the part of the UE) to actually perform the transmission according to the uplink reference signal configuration through a respective antenna port. Such a required transmission power may for example at least partially depend on the set of resource blocks over which the uplink reference signal is to be transmitted and optionally on several other factors. For example, a required transmission power may be determined at least partially based on the respective uplink reference signal configuration and/or a set of resource blocks contained therein.

A power headroom may for example indicate how much transmission power beyond a required transmission power remains at a UE for transmitting an uplink reference signal according to an uplink reference signal configuration. Accordingly, a power headroom may for example be understood as specific for a corresponding transmission of an uplink reference signal according to an uplink reference signal configuration. For example, a power headroom may be understood as difference between a maximum output power available at the UE minus a required transmission power, so that for example a positive value of a power headroom indicates that some power left under the maximum output power is still available at the UE for further signal amplification.

An uplink reference signal that is to be transmitted by a UE through a respective antenna port according to an uplink reference configuration may incur an insertion loss within the UE, which may for example be caused by several factors such as switching components (e.g. a switching matrix) or electrical connections (e.g. a PCB track or an RF cable) to the antenna corresponding to the respective antenna port within the UE. For example, the insertion loss incurred by an uplink reference signal transmitted through a specific antenna port may be the higher the further away the antenna port is located from a power amplifier within the UE. Thus, considering for example a UE equipped with multiple (e.g. 2, 4, 6 or 8) antennas and corresponding antenna ports, an uplink reference signal may incur different insertion losses depending on through which specific antenna port it is transmitted. In such an example, an insertion loss may be understood as an absolute insertion loss for a specific antenna port or as relative (e.g. additional) insertion loss, wherein an insertion loss for a specific antenna port may be given as an additional insertion loss compared to the insertion loss for another antenna port (e.g. the main antenna port or a reference antenna port). For example, the insertion loss incurred by an uplink reference signal transmitted through a specific antenna port which is located rather far away from a power amplifier may be given as additional insertion loss towards the insertion loss incurred by the uplink reference signal transmitted through an antenna port which is located closer to the power amplifier.

In some examples, insertion loss incurred by an uplink reference signal may depend on the frequency at which the uplink reference signal is transmitted, which for example means that the insertion loss incurred by the uplink reference signal may depend on the frequency bandwidth allocated to the uplink reference signal (e.g. in terms of resource blocks) and thus on the uplink reference signal configuration according to which the uplink reference signal is transmitted.

Assuming for example a transmission of an uplink reference signal according to an uplink reference signal configuration through a specific antenna port that requires a certain transmission power, a corresponding insertion loss may be determined that is to be incurred by the uplink reference signal within the UE as if it was actually transmitted according to the uplink reference signal configuration through the specific antenna port. In this example, at least partially based on the required transmission power, insertion loss and maximum output power available for transmitting the uplink reference signal according to the uplink reference signal configuration through a specific antenna port, it may be determined whether sufficient power headroom is available at the UE to compensate for the insertion loss. For example, if the power headroom is equal to or higher than the to be compensated insertion loss, it may be determined that sufficient power headroom to compensate for the insertion loss is available at the UE. Alternatively, if for example the power headroom is lower than the to be compensated insertion loss, it may be determined that sufficient power headroom to compensate for the insertion loss is not available at the UE. An availability of sufficient power headroom to compensate for insertion loss may be understood to mean that the UE is able to increase the required transmission power by the insertion loss and transmit a signal with this increased transmission power, without exceeding a maximum output power available at the UE.

Considering an example with multiple antenna ports at the UE, multiple respective insertion losses with different respective values may occur. In such an example, it may be determined that sufficient power headroom to compensate for the insertion loss is available at the UE if the power headroom is equal to or higher than the highest of the multiple to be compensated insertion losses.

With respect to the determining whether sufficient power headroom is available at the user equipment to compensate for at least one first insertion loss to be incurred within the user equipment by the at least one respective uplink reference signal transmitted according to the first configuration, it shall be understood that the at least one respective uplink reference signal is not actually transmitted when the step of determining whether sufficient power headroom is available is performed. The UE rather determines for example the headroom power before the at least one uplink reference signal is potentially transmitted according to the first configuration, wherein whether the at least one uplink reference signal is actually transmitted according to the first configuration or not depends on the determining whether sufficient power headroom is available or not.

If it is determined that sufficient power headroom to compensate for an insertion loss is not available at a UE, a re-configuration request for the uplink reference signal may be transmitted from the UE to a corresponding network node. For example, this may be understood to mean that the UE requests another uplink reference signal configuration (e.g. a second configuration), which is different from the previously received uplink reference signal configuration (e.g. the first configuration), and which for example allows for a lower required transmission power when transmitting the uplink reference signal according to this other configuration (e.g. a second configuration) compared to the previously received configuration (e.g. a first configuration).

For example, a re-configuration request for at least one uplink reference signal transmitted by the UE may comprise information indicating that sufficient power headroom to compensate for the at least one first insertion loss is not available. Additionally or alternatively, it may comprise information indicative of a second set of resource blocks, a request for modifying the first set of resource blocks, and/or a request for applying a second set of resource blocks, which for example may have been previously configured for the at least one uplink reference signal. This may be understood to mean that the UE in some examples may use the re-configuration request to merely inform the network node on the insufficient power headroom, which causes the network node to determine (and e.g. to transmit) a second set of resource blocks in return. In other examples, the UE may determine a second set of resource blocks (or e.g. determine potential modifications to the first set of resource blocks) itself and use the re-configuration request to inform the network node on this second set of resource blocks (or e.g. to ask permission for modifying the first set of resource blocks or for applying a modified first set of resource blocks).

The UE receives from the network node in response to the re-configuration request a second configuration for the at least one uplink reference signal associated with a second set of resource blocks over which the at least one uplink reference signal is to be transmitted, which may be understood to mean that transmitting the second configuration at least partially depends on the re-configuration request (e.g. the second configuration may be transmitted after or responsive to the re-configuration request received at the network node from the UE). For example, the second configuration may comprise information indicative of the second set of resource blocks. Additionally or alternatively, the second configuration may comprise a permission for modifying the first set of resource blocks and/or a permission for applying the second set of resource blocks.

The content of the second configuration may for example depend on the content of the re-configuration request for the at least one uplink reference signal. If for example the re-configuration request comprises information indicating that sufficient power headroom to compensate for the at least one first insertion loss is not available, and/or information on a second set of resource blocks, the second configuration may comprise information on a second set of resources. In another example, when the re-configuration request comprises a request for modifying the first set of resource blocks, the second configuration may comprise a permission for modifying the first set of resource blocks. In yet another example, when the re-configuration request comprises a request for applying the second set of resource blocks, the second configuration may comprise a permission for applying the second set of resource blocks.

For example, after receiving the re-configuration request from the UE at the network node and before transmitting a second configuration from the network node to the UE in response to the re-configuration request, further steps may be performed at the network node. For example, such further steps may be a checking of the re-configuration request, a determining of a second configuration (e.g. at least partially based on the re-configuration request) and others.

After receiving the second configuration at the UE, the UE transmits the at least one uplink reference signal according to the second configuration through the at least one respective antenna port. This may be understood to mean that the at least one uplink reference signal is transmitted over the second set of resource blocks. For example, the at least one uplink reference signal is not transmitted according to the first configuration due to insufficient power headroom, but is transmitted according to the second configuration.

Advantageously, transmitting the at least one uplink reference signal according to the second configuration through at least one respective antenna port, if it is determined that sufficient power headroom to compensate for the at least one first insertion loss is not available, may allow for mitigating the effect of insertion loss on reference signaling. If the at least one uplink reference signal was transmitted according to the first configuration without determining whether sufficient power headroom to compensate for the at least one first insertion loss is available, the power headroom may not be high enough to increase the required transmission power according to the first configuration sufficiently to compensate the first insertion loss, which may lead to the network node inaccurately estimating the channel status for the respective antenna port, hence resulting in performance degradation. Instead, requesting a re-configuration, that for example may allow for a lower required transmission power for transmitting the at least one uplink reference signal, may leave a higher power headroom and thus allow for compensating the insertion loss. This leads to better channel sounding which eventually improves the throughput for the user.

With respect to switching among multiple antennas for reference signaling, transmitting multiple uplink reference signals according to the second configuration through respective multiple respective antenna ports, if it is determined that sufficient power headroom to compensate for the respective first insertion losses is not available, may advantageously allow for mitigating insertion losses with respect to all involved antenna ports (e.g. if power headroom is considered sufficient if the highest of the multiple first insertion losses may be compensated). Eventually, the more antenna ports of a UE are involved and the higher the corresponding insertion losses may be, the more advantageous the above described approach is.

In the following, further exemplary features and exemplary embodiments of the different aspects of the present disclosure will be described in more detail.

According to an exemplary embodiment of the first or second aspect, sufficient power headroom is available at the user equipment to compensate for at least one second insertion loss incurred within the user equipment by the at least one respective uplink reference signal transmitted according to the second configuration.

As disclosed above, an uplink reference signal that is to be transmitted by a UE through a respective antenna port according to a first configuration may incur a first insertion loss within the UE. Likewise, an uplink reference signal that is to be transmitted by a UE through a respective antenna port according to a second configuration may incur a second insertion loss within the UE. The first and second insertion loss may for example be caused by several factors such as switching components (e.g. a switching matrix) or electrical connections (e.g. a PCB track or an RF cable) to the antenna corresponding to an antenna port. Additionally, the first and second insertion loss may be frequency dependent, which for example means that the first insertion loss incurred by an uplink reference signal may depend on the frequency bandwidth allocated to the uplink reference signal (e.g. in terms of resource blocks) according to the first configuration, while the second insertion loss incurred by an uplink reference signal may depend on the frequency bandwidth allocated to the uplink reference signal (e.g. in terms of resource blocks) according to the second configuration. It follows that in some examples, the first insertion loss may be equal to the second insertion loss and that in other examples, the first insertion loss may be different from (e.g. higher or lower than) the second insertion loss.

That sufficient power headroom is available at the user equipment to compensate for the at least one second insertion loss while sufficient power headroom is not available at the user equipment to compensate for the at least one first insertion loss may for example be due to a transmission power required to perform the transmission of the at least one uplink reference signal according to the second configuration (e.g. a second required transmission power) being lower than a transmission power required to perform the transmission of the at least one uplink reference signal according to the first configuration (e.g. a first required transmission power). According to this example, the power headroom available to compensate for the at least one second insertion loss may be higher (and thus rather sufficient) than the power headroom available to compensate for the at least one first insertion loss.

According to an exemplary embodiment of the first or second aspect, the determining whether sufficient power headroom is available at the user equipment to compensate for the at least one first insertion loss is at least based on a first required transmission power for the at least one uplink reference signal according to the first configuration, a maximum output power, and the at least one first insertion loss.

As described above, a first required transmission power for the at least one uplink reference signal according to the first configuration may be understood as transmission power required (e.g. on the part of the UE) to transmit the at least one uplink reference signal according to the first configuration through a respective antenna port. Such a required transmission power may for example depend on a set of resource blocks over which the uplink reference signal is to be transmitted and on several other factors.

A maximum output power may be understood as a maximum output power available at the UE, for example available for transmitting a signal such as an uplink reference signal according to an uplink reference signal configuration through an antenna port of the UE.

Determining whether sufficient power headroom is available to compensate for the at least one first insertion loss at least based on a first required transmission power, a maximum output power, and the at least one first insertion loss may be understood to mean that the power headroom (which is for example defined as difference between a maximum output power available at the UE minus a first required transmission power) is determined as sufficient if the power headroom is equal to or higher than the to be compensated at least one first insertion loss. For example, the power headroom may be considered sufficient if the following inequation is met:

$$P_{srs}+IL\leq P_{max},$$

with $P_{srs}$ denoting a required transmission power (e.g. the first required transmission power), $P_{max}$ denoting a maximum output power, and IL denoting an insertion loss (e.g. the at least one first insertion loss). In this example, the power headroom PH may be determined as $$PH=P_{max}-P_{srs}.$$

According to an exemplary embodiment of the first or second aspect, a first required transmission power for the at least one uplink reference signal according to the first configuration is higher than a second required transmission power for the at least one uplink reference signal according to the second configuration.

As describe above, the first required transmission power may for example depend on the first set of resource blocks over which the at least one uplink reference signal is to be transmitted and optionally on several other factors (e.g. on the specific antenna port through which the at least one uplink reference signal is to be transmitted). For example, the first (or second) required transmission power may be determined based on the first (or second) configuration and/or the first (or second) set of resource blocks contained therein. For example, the lower a number of resource blocks over which the at least one uplink reference signal is to be transmitted, the lower the required transmission power. Accordingly, a first required transmission power for the at least one uplink reference signal according to the first configuration may be higher than a second required transmission power for the at least one uplink reference signal according to the second configuration, because the first set of resource blocks contained in the first configuration may be larger than the second set of resource blocks contained in the second configuration.

According to an exemplary embodiment of the first or second aspect, the user equipment further comprises means for:

- determining a first required transmission power for the at least one uplink reference signal according to the first configuration; and/or
- determining a second required transmission power for the at least one uplink reference signal according to the second configuration; and/or
- obtaining or determining a maximum output power; and/or
- obtaining or determining the at least one first insertion loss and/or the at least one second insertion loss.

Determining a first (or second) required transmission power for the at least one uplink reference signal according to the first (or second) configuration may be understood as determining the transmission power required to transmit the at least one uplink reference signal through at least one respective antenna port of the user equipment according to the first (or second) configuration, wherein the first (or second) configuration comprises a first (or second) set of resource blocks over which the at least one uplink reference signal is to be transmitted. For example, the first (or second) required transmission power may be specific to the antenna port through which the at least one uplink reference signal is transmitted. For example, determining a first (or second) required transmission power for the at least one uplink reference signal according to the first (or second) configuration may be at least partially based on the first (or second) set of resource blocks contained in the first (or second) configuration. For example, if the number of a first set of resource blocks over which the at least one uplink reference signal is to be transmitted is reduced in order to arrive at a second set of resource blocks, this reduction may lead to reducing the required transmission power and thus to the first required transmission power being higher than the second required transmission power.

For example, a required transmission power for an uplink reference signal according to an uplink reference signal configuration may be determined as described in the 3GPP TS 38.211 (section 7.3) with regard to the 5G standard:

The maximum output power, and/or the at least one first insertion loss, and/or at least one second insertion loss may be determined by the UE or alternatively be obtained by the UE. For example, the maximum output power may be obtained by the UE when receiving an uplink reference signal configuration, wherein this uplink reference signal configuration specifies the maximum output power (e.g. an allowed maximum output power). Obtaining or determining an insertion loss (e.g. the at least one first insertion loss and/or the at least one second insertion loss) may involve calibration during UE production and/or characterization of the insertion loss during UE development or operation. As for example the insertion loss may depend on the frequency at which a corresponding signal is transmitted, any information on the insertion loss may also contain information on the frequency dependency of the insertion loss. For example, information on the insertion loss may be stored in the UE (e.g. in a memory of the UE).

According to an exemplary embodiment of the first or second aspect, the re-configuration request for the second configuration comprises one or more of the following:

- information indicating that sufficient power headroom to compensate for the at least one first insertion loss is not available;
- information indicative of the second set of resource blocks;
- a request for modifying the first set of resource blocks;
- a request for applying the second set of resource blocks.

For example, the re-configuration request comprises information indicating that sufficient power headroom to compensate for the at least one first insertion loss is not available if the UE may use the re-configuration request to report and/or inform the network node on the insufficient power headroom with respect to the first configuration, which may then cause the network node to determine and transmit a second set of resource blocks contained in a second configuration in return.

In another example, the UE may determine a second set of resource blocks (or e.g. determine potential modifications to the first set of resource blocks) itself and use the re-configuration request to inform the network node on the second set of resource blocks, or the modified first set of resource blocks. In this example, the information indicative of the second set of resource blocks may comprise the second set of resource blocks and/or may indicate that a second set of resource blocks (or simply a set of resource blocks different from first set of resource blocks) has been identified at the UE as for example a preferred set of resource blocks (which are e.g. contained in a preferred configuration). In other examples, the information indicative of the second set of resource blocks may comprise information on modifying the first set of resource blocks in order to arrive at the second set of resource blocks. The first set of resource blocks may be modified in various ways, for example by masking the first set of resource blocks (e.g. by masking by a certain degree), and/or by using a bit pattern over the first set of resource blocks, and/or by reducing the first set of resource blocks (e.g. reducing the first set of resource blocks by a certain ratio such as one half/quarter of the first set of resource blocks).

It may be understood that if for example the UE itself determines a second set of resource blocks, and/or modifies the first set of resource blocks, the re-configuration request for the second configuration may comprise a request for modifying the first set of resource blocks and/or a request for applying the second set of resource blocks. Applying the second set of resource blocks may for example be understood to mean that the UE transmits the at least one uplink reference signal according to the second configuration which comprises the second set of resource blocks, such that the at least one uplink reference signal is transmitted over the second set of resource blocks.

For example, a request for modifying the first set of resource blocks and/or a request for applying the second set of resource blocks is (or e.g. needs to be) granted (e.g. permitted or approved) by the network node before the UE may modify the first set of resource blocks or apply the second set of resource blocks.

According to an exemplary embodiment of the first or second aspect, the second set of resource blocks is a strict subset of the first set of resource blocks and is obtained by masking one or more resource blocks in the first set of resource blocks as being excluded for transmission of the at least one uplink reference signal, or by enabling one or more resource blocks in the first set of resource blocks as being allowed for transmission of the at least one uplink reference signal.

For example, the second set of resource blocks being a strict subset of the first set of resource blocks is to be understood to mean that the number of resource blocks in the second set of resource blocks is reduced towards the number of resource blocks in the first set of resource blocks. This reduction may be obtained by masking one or more resource blocks in the first set of resource blocks as being excluded or by enabling one or more resource blocks in the first set of resource blocks as being allowed for transmission of the at least one uplink reference signal.

According to an exemplary embodiment of the first or second aspect, the user equipment further comprises means for:

- transmitting, to the network node, the at least one uplink reference signal according to the first configuration through the at least one respective antenna port, if it is determined that sufficient power headroom to compensate for the at least one first insertion loss is available.

This exemplary embodiment relates to the case where sufficient power headroom is already available to compensate for the at least one first insertion loss. In this example, there is no need for requesting a re-configuration and transmitting the at least one uplink reference signal according to a second configuration instead of the first configuration.

According to an exemplary embodiment of the first or second aspect, sufficient power headroom at the user equipment to compensate for at least one second insertion loss incurred within the user equipment by the at least one respective uplink reference signal transmitted according to the second configuration is not available, and the user equipment transmits, to the network node, in addition to the at least one uplink reference signal according to the second configuration, information indicating at least one uncompensated second insertion loss.

Assuming that for example the UE has received a second configuration for the at least one uplink reference signal, it may be that the sufficient power headroom at the user equipment to compensate for at least one second insertion loss incurred within the user equipment by the at least one respective uplink reference signal transmitted according to the second configuration is not available. This may be the case if for example the UE has requested modifying the first set of resource block by for example reducing the first set of resource blocks by a certain amount (e.g. by a certain degree of masking), and the network node has only permitted to reduce the first set of resource blocks by a lower amount than requested. In such an example, the uncompensated second insertion loss may be given by the sum of second required transmission power and second insertion loss reduced by the maximum output power, meaning that even if the UE transmits the uplink reference signal with maximum output power (i.e. under the full use of the power headroom), the second insertion loss cannot be fully compensated. It may then be advantageous to still transmit the uplink reference signal according to the second configuration and additionally report the uncompensated second insertion loss (e.g. instead of the total second insertion loss) to the network node, such that knowledge on the uncompensated second insertion loss may be used at the network node for channel estimation and/or further re-configuration.

According to an exemplary embodiment of the first or second aspect, the user equipment further comprises means for:

- determining information indicating that sufficient power headroom to compensate for the first loss of signal power is not available; and/or
- determining information indicative of the second set of resource blocks; and/or
- determining a request for modifying the first set of resource blocks; and/or
- determining a request for applying the second set of resource blocks.

Considering for example a case where the UE does not merely inform the network node on insufficient power headroom but rather determines information indicative of the second set of resource blocks itself, the UE comprises means for determining information indicative of the second set of resource blocks. According to other exemplary embodiments, the step of determining information indicative of the second set of resource blocks may be performed at the network node which then comprises means for determining information indicative of the second set of resource blocks.

According to an exemplary embodiment of the first or second aspect, the second configuration comprises one or more of the following:

- information indicative of the second set of resource blocks;
- a permission for modifying the first set of resource blocks;
- a permission for applying the second set of resource blocks.

For example, the content of the second configuration may at least partially depend on the re-configuration request for the second configuration received at the network node from the UE. If for example the re-configuration request for the second configuration comprises information indicating that sufficient power headroom to compensate for the at least one first insertion loss is not available, the second configuration may comprise information indicative of the second set of resource blocks and/or a permission for modifying the first set of resource blocks and/or a permission for applying a second set of resource blocks. If in another example the re-configuration request for the second configuration comprises information indicative of the second set of resource blocks, the second configuration may comprise also information indicative of the second set of resource blocks and/or comprise a permission for applying the second set of resource blocks. If in yet another example the re-configuration request for the second configuration comprises a request for modifying the first set of resource blocks and/or a request for applying the second set of resource blocks, the second configuration may comprise a permission for modifying the first set of resource blocks and/or a permission for applying the second set of resource blocks.

Considering an example that the re-configuration request for the second configuration comprises a request for modifying the first set of resource blocks and that the second configuration may comprise a permission for modifying the first set of resource blocks, it may be that the permitted modifying is equal to or different from the required modifying. For example, if is required by the UE to modify the first set of resource blocks by reducing the number of resource blocks by a certain amount (e.g. by a requested degree of masking or reducing), it may be that the network node permits (e.g. allows for a grants) reducing the number of resource blocks by the request number of by a number lower than requested (e.g. by a degree of masking which is lower than the request degree of masking). Alternatively or additionally, the network node may permit modifying the first set of resource blocks by specifying (e.g. in the permission or in information indicative of the second set of resource blocks) a maximum degree of modifying (e.g. of masking or reducing of resource blocks). Eventually, these examples may lead to an uncompensated second insertion loss as described above.

According to an exemplary embodiment of the first or second aspect, the network node further comprises means for:

- determining information indicative of the second set of resource blocks;
- determining a permission for modifying the first set of resource blocks;
- determining a permission for applying the second set of resource blocks.

Considering for example a case where the UE merely informs the network node on insufficient power headroom, the network node comprises means for determining information indicative of the second set of resource blocks. According to other exemplary embodiments, the step of determining information indicative of the second set of resource blocks may be performed at the UE which then comprises means for determining information indicative of the second set of resource blocks.

It is to be understood that the presentation of the embodiments disclosed herein is merely by way of examples and non-limiting.

Herein, the disclosure of a method step shall also be considered as a disclosure of means for performing the respective method step. Likewise, the disclosure of means for performing a method step shall also be considered as a disclosure of the method step itself.

Other features of the present disclosure will become apparent from the following detailed description considered in conjunction with the accompanying drawings. It is to be understood, however, that the drawings are designed solely for purposes of illustration and not as a definition of the limits of the present disclosure, for which reference should be made to the appended claims. It should be further understood that the drawings are not drawn to scale and that they are merely intended to conceptually illustrate the structures and procedures described herein.

BRIEF DESCRIPTION OF THE FIGURES

Some example embodiments will now be described with reference to the accompanying drawings.

DETAILED DESCRIPTION OF THE FIGURES

The following description serves to deepen the understanding of the present disclosure and shall be understood to complement and be read together with the description of example embodiments of the present disclosure as provided in the above summary section of this specification.

While the specific radio system in the examples below is 5G, this is only to be considered a non-limiting example.

Figure 1:
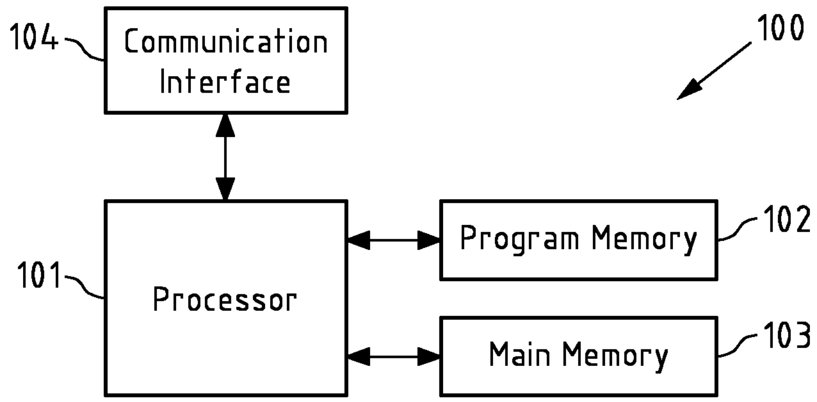
FIG. 1 is a block diagram of an exemplary embodiment of a UE according to the present disclosure.

FIG. 1 shows a block diagram of an exemplary embodiment of a UE 100 according to the present disclosure. For example, UE 100 may be one of a smartphone, a tablet computer, a notebook computer, a smart watch, a smart band, an IoT device or a vehicle.

UE 100 comprises a processor 101. Processor 101 may represent a single processor or two or more processors, which are for example at least partially coupled, for example via a bus. Processor 101 executes a program code stored in program memory 102 (for example program code causing UE 100 together with network node 200 to perform one or more of the embodiments of a method according to the present disclosure or parts thereof, when executed on processor 101), and interfaces with a main memory 103. Program memory 102 may also contain an operating system for processor 101. Some or all of memories 102 and 103 may also be included into processor 101.

One of or both of a main memory and a program memory of a processor (e.g. program memory 102 and main memory 103) could be fixedly connected to the processor (e.g. processor 101) or at least partially removable from the processor, for example in the form of a memory card or stick.

A program memory (e.g. program memory 102) may for example be a non-volatile memory. It may for example be a FLASH memory (or a part thereof), any of a ROM, PROM, EPROM, MRAM or a FeRAM (or a part thereof) or a hard disc (or a part thereof), to name but a few examples. For example, a program memory may for example comprise a first memory section that is fixedly installed, and a second memory section that is removable from, for example in the form of a removable SD memory card.

A main memory (e.g. main memory 103) may for example be a volatile memory. It may for example be a DRAM memory, to give non-limiting example. It may for example be used as a working memory for processor 101 when executing an operating system, an application, a program, and/or the like.

Processor 101 further controls a communication interface 104 (e.g. radio interface) configured to receive and/or transmit data and/or information. For example, communication interface 104 may be configured to transmit and/or receive radio signals to/from a network node, such as a base station. It is to be understood that any computer program code based processing required for receiving and/or evaluating radio signals may be stored in an own memory of communication interface 104 and executed by an own processor of communication interface 104 and/or it may be stored for example in memory 103 and executed for example by processor 101.

Communication interface 104 may in particular be configured to communicate according to a cellular communication system like a 2G/3G/4G/5G or future generation cellular communication system. UE 100 may use radio interface 104 to communicate with a base station, e.g. a network node depicted in FIG. 2.

For example, the communication interface 104 may further comprise a BLE (Bluetooth Low Energy) and/or Bluetooth radio interface including a BLE and/or Bluetooth transmitter, receiver or transceiver. For example, radio interface 104 may additionally or alternatively comprise a WLAN (Wireless Local Area Network) radio interface including at least a WLAN transmitter, receiver or transceiver.

The components 102 to 104 of UE 100 may for example be connected with processor 101 by means of one or more serial and/or parallel busses.

It is to be understood that UE 100 may comprise various other components. For example, UE 100 may optionally comprise a user interface (e.g. a touch-sensitive display, a keyboard, a touchpad, a display, etc.).

Figure 2:
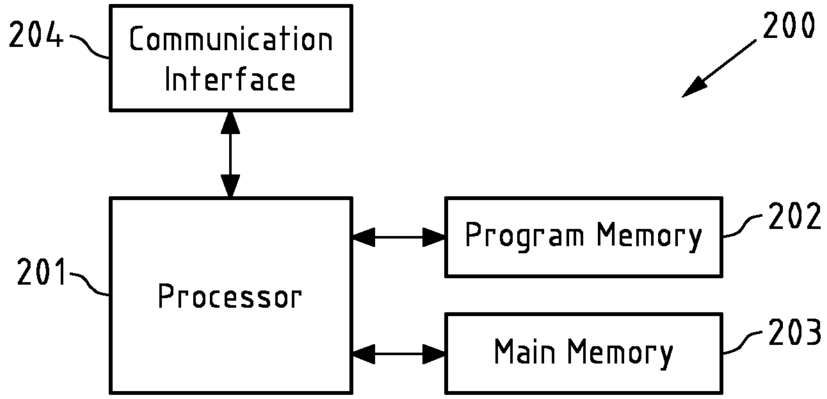
FIG. 2 is a block diagram of an exemplary embodiment of a network node according to the present disclosure.

FIG. 2 is a block diagram of an exemplary embodiment of a network node, such as base station (e.g. a gNB, eNodeB, BS or the like).

Network node 200 comprises a processor 201. Processor 201 may represent a single processor or two or more processors, which are for example at least partially coupled, for example via a bus. Processor 201 executes a program code stored in program memory 202 (for example program code causing network node 200 to perform alone or together with UE 100 embodiments according to the present disclosure or parts thereof), and interfaces with a main memory 203.

Program memory 202 may also comprise an operating system for processor 201. Some or all of memories 202 and 203 may also be included into processor 201.

Moreover, processor 201 controls a communication interface 204 which is for example configured to communicate according to a cellular communication system like a 2G/3G/4G/5G cellular communication system.

The components 202 to 204 of network node 200 may for example be connected with processor 201 by means of one or more serial and/or parallel busses.

UE 100 together with communication interface 104 may in particular be configured for receiving reference signals from a network node 200 according to the approach scheme describe herein.

It is to be understood that apparatuses 100, 200 may comprise various other components.

Figure 3:
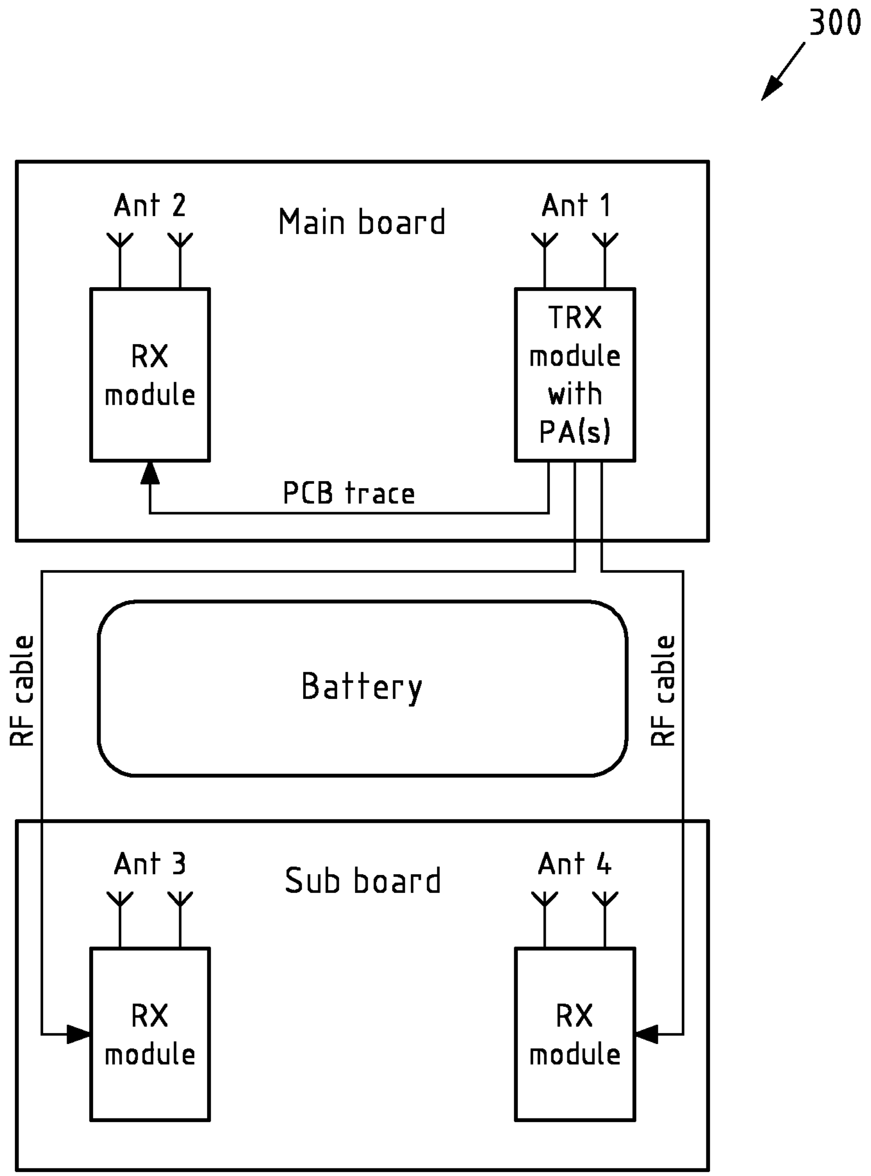
FIG. 3 is a schematic illustration of an exemplary embodiment of a UE according to the present disclosure.

FIG. 3 is a schematic illustration of exemplary embodiment of a UE according to the present disclosure, which may for example be considered a typical architecture for a UE for 5G NR FR1 operation. For exemplary purposes and without limiting the scope of the present disclosure, it is assumed in the following that UE 300 supports antenna switching when transmitting sounding reference signals (SRS) as uplink reference signals through respective multiple antenna ports (e.g. as indicated in the SRS resource set given by the gNB, refer to 3GPP TS 38.214, section 6.2.1.2). For example, SRS are used for channel estimations, UL/DL beam-selection, MCS selection, link adaption, UL/DL communication and other scenarios.

UE 300 comprises multiple antennas with two antennas (TRX, RX) located on the top, two others (RX, RX) on the bottom and a power amplifier (PA) module (optionally more than one PA module) located near the TRX antenna. A PCB (printed circuit board) trace is used on the main board to connect the TRX antenna (main antenna) and one of the RX antennas to the PA, and RF cables are used to connect the two RX antennas on the sub-board to the PA module. It may be assumed that UE 300 supports 3.5 GHZ (n77/n78) and 4.9 GHZ (n79) transmission with separate antennas. The two antennas elements drawn for each antenna may correspond to two polarization states.

Considering the exemplary architecture of UE 300, transmitting the SRS signal only from the TRX antenna would lead to the gNodeB inaccurately estimating the channel status of the pure Rx antenna, hence resulting in DL MIMO performance degradation for these antennas. Therefore, SRS antenna switching is designed to solve this issue by switching SRS transmission among TRX and RX antennas.

For example, the typical UE architecture with only a subset of the antennas being TRX (both RX and TX) and the rest being pure RX may cause the SRS switching functionality to exhibit an extra insertion loss. In particular, switching the output of the TRX antenna PA to the different pure RX antennas may yield a higher insertion loss, especially for the RX antennas most far away from the PA. The additional insertion losses from PA to pure RX antennas compared to insertion losses from PA to the main TRX antenna caused by SRS switching may be calculated by adding insertion losses from switches, PCB traces and RF cables. Furthermore, the insertion loss increases with the frequency of the operating band. This power difference in the transmitted SRS signals may impact the channel sounding done by the gNB and thereby reduce the DL performance and throughput.

For example, evaluating the resulting performance degradation for four antennas yields that increasing SRS switching loss from 3 dB to 6 dB drops the throughput in 4×4 DL MIMO by more than 5% with respect to a scenario without insertion loss.

Figure 4:
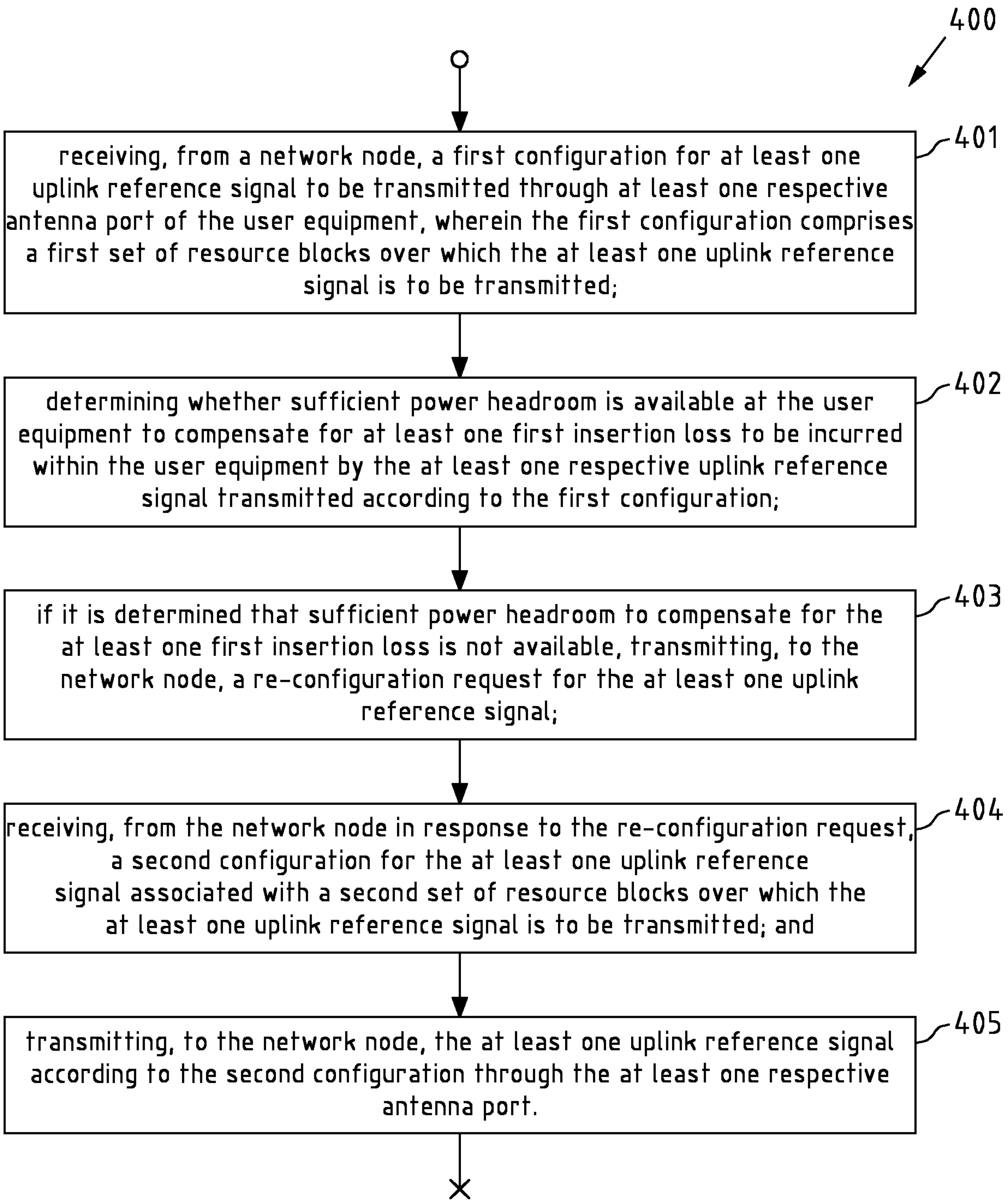
FIG. 4 is a flow chart illustrating an exemplary embodiment of a method according to the first aspect of the present disclosure.

FIG. 4 is a flow chart 400 illustrating an exemplary embodiment of a method according to the first aspect of present disclosure. Without limiting the scope of the disclosure, it is assumed in the following that a UE as depicted in FIG. 1 or FIG. 3 performs the actions of flow chart 400.

In action 401, the UE receives, from a network node, a first configuration for at least one uplink reference signal to be transmitted through at least one respective antenna port of the UE, wherein the first configuration comprises a first set of resource blocks over which the at least one uplink reference signal is to be transmitted.

For example, the UE receives from a gNB an RRC configuration for an SRS to be transmitted through a particular antenna port of the UE, wherein the RRC configuration comprises a set of resource blocks over which the SRS is to be transmitted (e.g., this may not necessarily imply that all sub-carriers of the resource blocks in the set of resource blocks are used for transmission, since the exact sub-carriers that carry the SRS are e.g. further defined based on a frequency offset and a frequency density according to an RRC configuration for the SRS). In another example, the UE may exhibit multiple antenna ports (e.g. 2, 4, 6 or 8) and one respective SRS is to be transmitted through several or all of these multiple antenna ports to perform SRS antenna switching.

In action 402, the UE determines whether sufficient power headroom is available at the UE to compensate for at least one first insertion loss to be incurred within the UE by the at least one respective uplink reference signal transmitted according to the first configuration;

For example, the UE determines a required transmission power $P_{srs}$ that would be required for potentially transmitting an SRS through a particular antenna port of the UE according to the RRC configuration received in action 401. Further, based on an insertion loss IL incurred by the SRS if the SRS would actually be transmitted through the particular antenna port of the UE according to the RRC configuration received in action 401 and also based on a maximum output power $P_{max}$ available at the UE, the UE may determine whether the following inequation is met:

$$P_{srs} + IL \leq P_{max},$$

and determine that sufficient power headroom is available if the inequation is met and that sufficient power headroom is not available if the inequation is not met. In this example, the power headroom PH may be determined as $PH=P_{max}-P_{srs}$.

According to another example with multiple respective SRS to be transmitted through several or all of multiple antenna ports of the UE to perform SRS antenna switching, $P_{srs}$, IL and power headroom may be determined for each of the respective several or all of the multiple antenna ports, which leads to checking the inequation $P_{srs}+IL \leq P_{max}$ for each of the respective several or all of the multiple antenna ports. For example, it may be determined that sufficient power headroom is available if the inequations are met for each of the respective several or all of the multiple antenna ports and that sufficient power headroom is not available if the inequation is not met for at least one of the several or all of the multiple antenna ports.

In action 403, if it is determined that sufficient power headroom to compensate for the at least one first insertion loss is not available, the UE transmits, to the network node, a re-configuration request for the at least one uplink reference signal.

For example, the UE transmits to the gNB an update request for the SRS to be transmitted, wherein the update request may comprise information indicating that sufficient power headroom to compensate for the insertion loss is not available. In other examples, the update request may comprise information indicative of an updated set of resource blocks (which may e.g. be determined based on the set of resource blocks contained in the RRC configuration received in action 401, or which may e.g. refer to a previously-configured set of resource blocks); a request for modifying (e.g. by masking/enabling bit-patterns, reducing the number of resource blocks and other operations) the set of resource blocks contained in the RRC configuration received in action 401; and/or a request for applying an updated set of resource blocks.

In action 404, the UE receives, from the network node in response to the re-configuration request, a second configuration for the at least one uplink reference signal associated with a second set of resource blocks over which the at least one uplink reference signal is to be transmitted.

For example, the UE receives from the gNB a RRC reconfiguration for SRS transmission that is associated with an updated set of resource blocks. For example, the RRC reconfiguration comprises information indicative of the updated set of resource blocks (which may e.g. be determined based on the set of resource blocks contained in the RRC configuration received in action 401, or which may e.g. refer to a previously-configured set of resource blocks); a permission for modifying (e.g. by masking/enabling bit-patterns, reducing the number of resource blocks and other operations) the set of resource blocks contained in the RRC configuration received in action 401; and/or a request for applying an updated set of resource blocks. For example, applying the updated set of resource blocks may be understood to mean that the UE transmits the SRS according to a reconfiguration which comprises the updated set of resource blocks, such that the SRS is transmitted over the updated of resource blocks.

It may be understood in particular with respect to actions 403 and 404, that the UE itself may determine the updated set of resource blocks and/or may perform the modifying (e.g. by masking/enabling bit-patterns, reducing the number of resource blocks and other operations) of resource blocks contained in the RRC configuration received in action 401, and that alternatively the gNB itself may determine the updated set of resource blocks and/or may perform the modifying (e.g. by masking/enabling bit-patterns, reducing the number of resource blocks and other operations) of resource blocks contained in the RRC configuration received in action 401.

In action 405, the UE transmits, to the network node, the at least one uplink reference signal according to the second configuration through the at least one respective antenna port For example, the UE transmits to the gNB the SRS according to the RRC reconfiguration received in action 404 over the updated set of resource blocks. Transmitting the SRS over the updated set of resource blocks may require a lower transmission power $P_{srs}$ compared to the set of resource blocks contained in the RRC configuration received in action 401, such that the inequation $P_{srs}+IL \leq P_{max}$ may be met when transmitting the SRS over the updated set of resource blocks. Accordingly, the UE may transmit the SRS with a transmission power of $P_{srs}+IL$ and thus compensate for an insertion loss incurred by the SRS transmitted through the particular antenna port of the UE according to the RRC reconfiguration.

According to another example with multiple respective SRS to be transmitted through respective several or all of multiple antenna ports of the UE to perform SRS antenna switching, the UE may transmit an SRS with a transmission power of $P_{srs}+IL$ according to the RRC reconfiguration received in action 404 through each of the several or all antenna ports of the multiple antenna ports and thus compensate for respective insertion losses incurred by the SRS transmitted through the several or all antenna ports of the multiple antenna ports of the UE.

Figure 5:
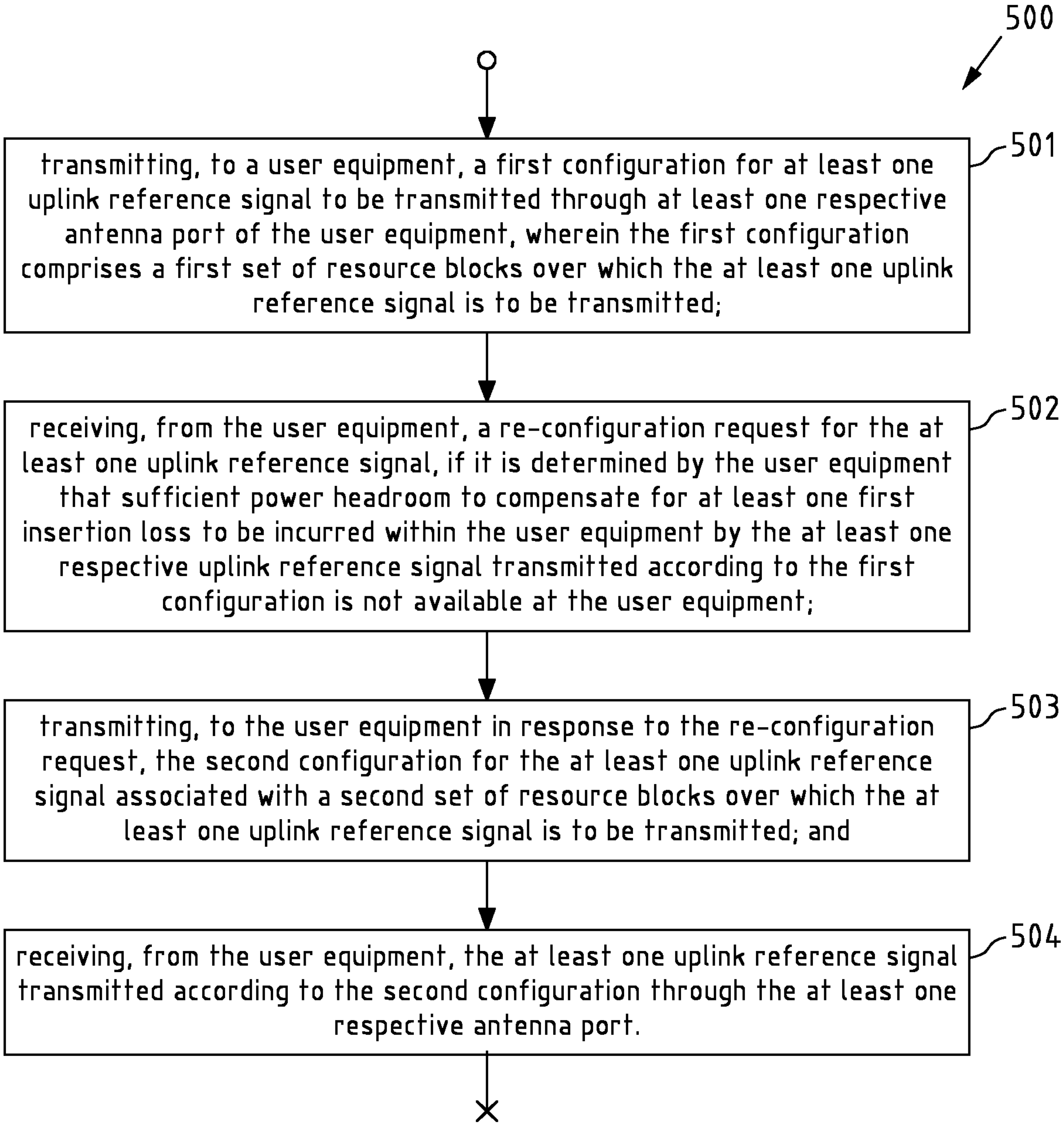
FIG. 5 is a flow chart illustrating an exemplary embodiment of a method according to the second aspect of the present disclosure.

FIG. 5 is a flow chart 500 illustrating an exemplary embodiment of a method according to the second aspect of present disclosure. Without limiting the scope of the disclosure, it is assumed in the following that a network node as depicted in FIG. 2 performs the actions of flow chart 500.

In action 501, the network node transmits, to a UE, a first configuration for at least one uplink reference signal to be transmitted through at least one respective antenna port of the UE, wherein the first configuration comprises a first set of resource blocks over which the at least one uplink reference signal is to be transmitted.

For example, a gNB transmits to the UE an RRC configuration for an SRS to be transmitted through a particular antenna port of the UE, wherein the RRC configuration comprises a set of resource block over which the SRS is to be transmitted (e.g., this may not necessarily imply that all sub-carriers of the resource blocks in the set of resource blocks are used for transmission, since the exact sub-carriers that carry the SRS are e.g. further defined based on a frequency offset and a frequency density according to an RRC configuration for the SRS). In another example, the UE may exhibit multiple antenna ports (e.g. 2, 4, 6 or 8) and one respective SRS is to be transmitted through several or all of the multiple antenna ports to perform SRS antenna switching.

In action 502, the network node receives, from the UE, a re-configuration request for the at least one uplink reference signal, if it is determined by the user equipment that sufficient power headroom to compensate for at least one first insertion loss to be incurred within the UE by the at least one respective uplink reference signal transmitted according to the first configuration is not available at the user equipment.

For example, the gNB receives form the UE an update request for the SRS to be transmitted, wherein the update request may comprise information indicating that sufficient power headroom to compensate for the insertion loss is not available. In other examples, the update request may comprise information indicative of an updated set of resource blocks (which may e.g. be determined based on the set of resource blocks contained in the RRC configuration received in action 401, or which may e.g. refer to a previously-configured set of resource blocks); a request for modifying (e.g. by masking/enabling bit-patterns, reducing the number of resource blocks and other operations) the set of resource blocks contained in the RRC configuration transmitted in action 401; and/or a request for applying an updated set of resource blocks.

In action 503, the network node transmits, to the UE in response to the re-configuration request, a second configuration for the at least one uplink reference signal associated with a second set of resource blocks over which the at least one uplink reference signal is to be transmitted For example, the gNB transmits to the UE a RRC reconfiguration for SRS transmission that is associated with an updated set of resource blocks. For example, the RRC reconfiguration comprises information indicative of the updated set of resource blocks (which may e.g. be determined based on the set of resource blocks contained in the RRC configuration transmitted in action 501, or which may e.g. refer to a previously-configured set of resource blocks); a permission for modifying (e.g. by masking/enabling bit-patterns, reducing the number of resource blocks and other operations) the set of resource blocks contained in the RRC configuration transmitted in action 501; and/or a request for applying an updated set of resource blocks. For example, applying the updated set of resource blocks may be understood to mean that the UE transmits the SRS according to a reconfiguration which comprises the updated set of resource blocks, such that the SRS is transmitted over the updated of resource blocks.

It may be understood in particular with respect to actions 502 and 503, that the UE itself may determine the updated set of resource blocks and/or may perform the modifying (e.g. by masking/enabling bit-patterns, reducing the number of resource blocks and other operations) of resource blocks contained in the RRC configuration transmitted in action 501, and that alternatively the gNB itself may determine the updated set of resource blocks and/or may perform the modifying (e.g. by masking/enabling bit-patterns, reducing the number of resource blocks and other operations) of resource blocks contained in the RRC configuration transmitted in action 501.

In action 504, the network node receives, from the UE, the at least one uplink reference signal transmitted according to the second configuration through the at least one respective antenna port.

For example, the gNB receives from the UE the SRS according to the RRC reconfiguration transmitted in action 503 over the updated set of resource blocks. Transmitting the SRS over the updated set of resource blocks may require a lower transmission power $P_{srs}$ compared to the set of resource blocks contained in the RRC configuration transmitted in action 501, such that the inequation $P_{srs}+IL \leq P_{max}$ may be met when transmitting the SRS over the updated set of resource blocks. Accordingly, the UE may transmit the SRS with a transmission power of $P_{srs}+IL$ and thus compensate for an insertion loss incurred by the SRS transmitted through the particular antenna port of the UE according to the RRC reconfiguration.

According to another example with multiple respective SRS is to be transmitted through respective several or all of multiple antenna ports of the UE to perform SRS antenna switching, the UE may transmit an SRS with a transmission power of $P_{srs}+IL$ according to the RRC reconfiguration transmitted in action 503 through each of the several or all antenna ports of the multiple antenna ports and thus compensate for the respective insertion losses incurred by the SRS transmitted through the several or all antenna ports of the multiple antenna ports of the UE.

Advantageously, the actions described above in FIGS. 4 and 5 according to respective exemplary embodiment of the present disclosure allow for mitigating the effect of insertion loss on SRS. If for example the SRS was transmitted according to the RRC configuration received/transmitted actions 401/501 without determining whether sufficient power headroom to compensate for insertion loss is available, the power headroom may not be high enough to increase the required transmission power according to the RRC configuration sufficiently to compensate for the insertion loss, which may lead to the gNB inaccurately estimating the channel status for the respective antenna port, hence resulting in performance degradation. Instead, requesting a re-configuration that for example may allow for a lower required transmission power for transmitting the SRS may leave a higher power headroom and thus allow for compensating for the insertion loss. This leads to better channel sounding which eventually improves the throughput for the user.

Figure 6:
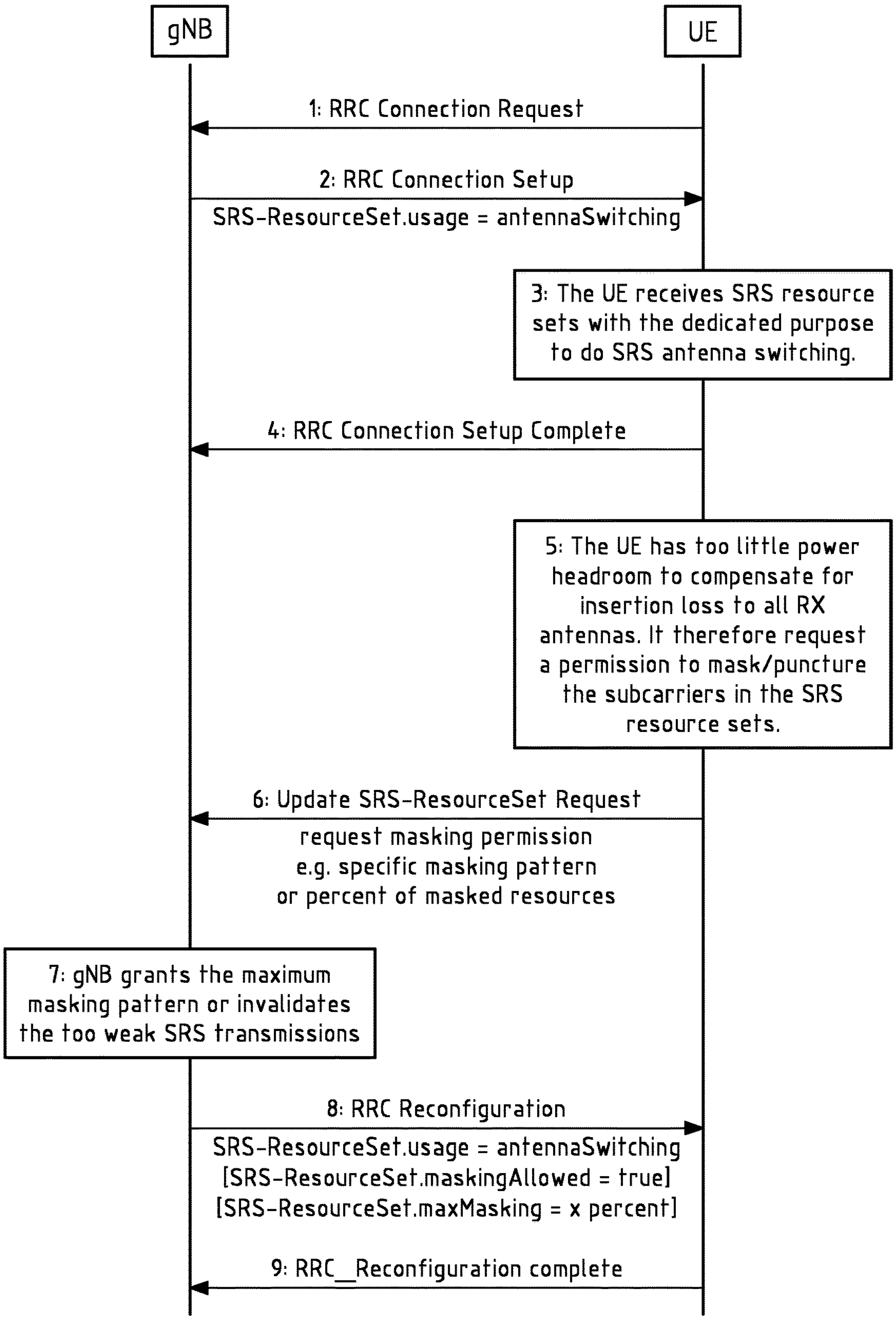
FIG. 6 is a signal chart illustrating an exemplary embodiment of a method according to the present disclosure.
Figure 7:
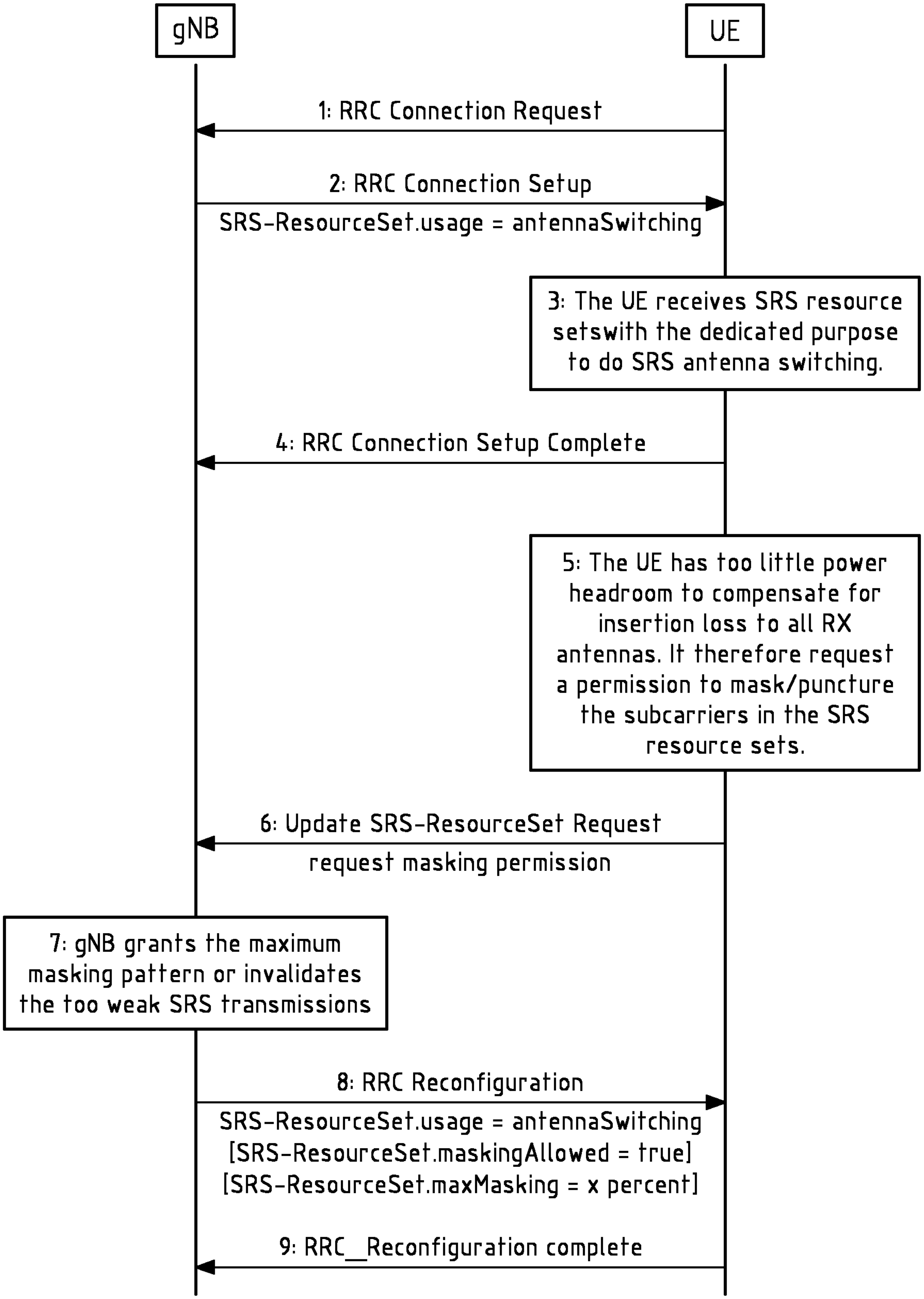
FIG. 7 is a signal chart illustrating an exemplary embodiment of a method according to the present disclosure.

FIG. 6 and FIG. 7 are both signal charts illustrating respective exemplary embodiments of a method according to the present disclosure. For exemplary purposes and without limiting the scope of the present disclosure, it is assumed in the following that a UE (e.g. apparatus 100 as depicted FIG. 1 or a UE 300 as depicted in FIG. 3) communicates with a gNB (e.g. apparatus 200 as depicted in FIG. 2).

Actions 1 to 5 depicted in FIGS. 6 and 7 are identical in both figures and may be understood as follows:

The UE receives from the gNB in action 2 an RRC configuration (e.g. as a first configuration for at least one uplink reference signal to be transmitted through at least one respective antenna port of the UE), which for example may have been transmitted by the gNB upon request from the UE (action 1). As part of the RRC configuration, the UE also receives SRS resource sets in action 3 (e.g. a first set of resource blocks contained in the first configuration, over which the at least one uplink reference signal is to be transmitted). This SRS resource sets may determine that antenna switching is to be applied by the UE (e.g. that the at least one uplink reference signal to be transmitted through at least one respective antenna port of the UE). For example, receiving the RRC configuration by the UE may be completed in action 4. In action 5, the UE determines that too little power headroom to compensate for insertion losses at all RX antennas is available if the UE would actually transmit an SRS according to the previously received RRC configuration (e.g. by determining whether sufficient power headroom is available at the UE to compensate for at least one first insertion loss incurred within the UE by the at least one respective uplink reference signal transmitted according to the first configuration).

Actions 6 and 7 depicted in FIGS. 6 and 7 are different in the two figures and may be understood as follows:

According to FIG. 6, the UE transmits an update request for an SRS (e.g. a re-configuration request for the at least one uplink reference signal) in action 6, wherein the update request comprises a specific request for masking resource blocks in the previously received set of resource blocks as being excluded for transmission (e.g. as request for modifying the first set of resource blocks to derive a second set of resource blocks, wherein the first set of resource blocks is modified by masking). In an alternative exemplary embodiment, an update request may comprise a specific request for enabling resource blocks in the previously received set of resource blocks as being allowed for transmission. According to these examples, the set of resource blocks that is obtained by masking or enabling may be a strict subset of the previously received set of resource blocks.

Subsequently in action 7 according to FIG. 6, the gNB receives the update request and determines whether to permit the requested masking (e.g. the gNB determines a permission for modifying the first set of resource blocks by masking). Following FIG. 6, the UE determines and transmits a specific masking pattern itself and the gNB grants or declines the request.

According to FIG. 7, the UE transmits an update request for an SRS (e.g. a re-configuration request for the at least one uplink reference signal) in action 6, wherein the update request informs on insufficient power headroom and requests masking resource blocks in the previously received set of resource blocks as being excluded for transmission, but without comprising a specific request (e.g. the re-configuration request comprises information indicating that sufficient power headroom to compensate for the at least one first insertion loss is not available). In an alternative exemplary embodiment, an update request requests enabling resource blocks in the previously received set of resource blocks as being allowed for transmission, but without comprising a specific request. According to these examples, the set of resource blocks that is obtained by masking or enabling may be a strict subset of the previously received set of resource blocks.

Subsequently in action 7 according to FIG. 7, the gNB not only grants or declines the request, but calculates a specific masking pattern itself (e.g. by determining information indicative of the second set of resource blocks). Following FIG. 7, the UE sends a masking request and the gNB actively determines (e.g. calculates) a masking pattern (e.g. a maximum masking pattern).

Actions 8 and 9 depicted in FIGS. 6 and 7 are identical in both figures and may be understood as follows:

In response to the update request, the gNB transmits in action 8 an RRC reconfiguration for transmitting an SRS (e.g. as second configuration for the at least one uplink reference signal associated with a second set of resource blocks over which the at least one uplink reference signal is to be transmitted in response to the re-configuration request) to the UE. This RRC reconfiguration may allow for masking resource blocks in the set of resource blocks contained in the previously received configuration (e.g. the first configuration). For example, the RRC reconfiguration may comprise a updated set of resource blocks that is different from the previously received set of resource blocks (e.g, thus forming a second set of resource blocks) and that allows transmitting an SRS with a lower required transmission power. For example, receiving the RRC reconfiguration by the UE may be completed in action 4. Transmitting an SRS according to the RRC reconfiguration may allow for sufficient power headroom and thus for compensating for the insertion loss that occurs when transmitting an SRS according to the RRC reconfiguration (such that e.g. sufficient power headroom is available at the UE to compensate for at least one second insertion loss incurred within the UE by the at least one respective uplink reference signal transmitted according to the second configuration).

Figure 8:
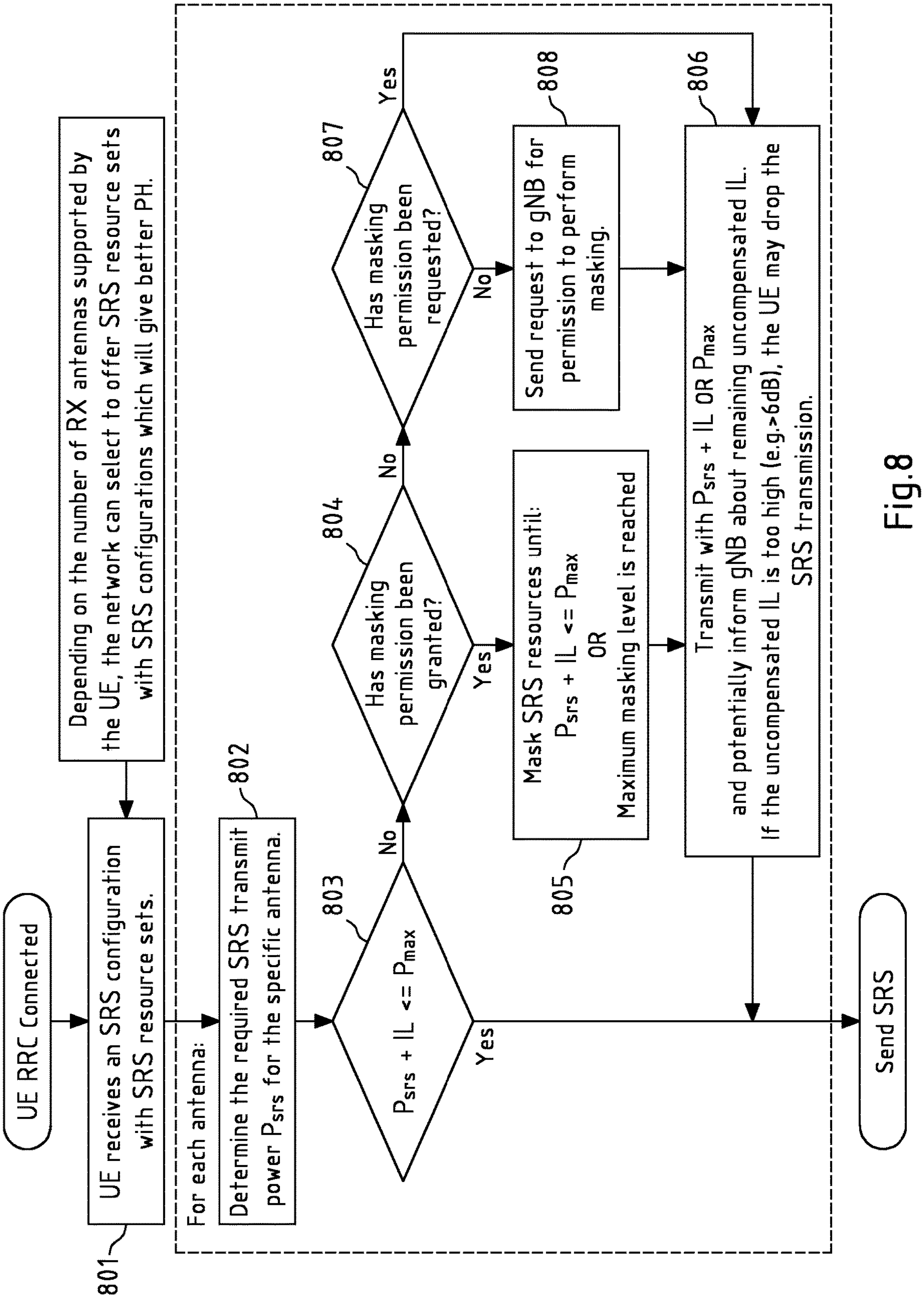
FIG. 8 is a flow chart illustrating an exemplary embodiment of a method according to the present disclosure.

FIG. 8 is a flow chart illustrating an exemplary embodiment of a method according to the present disclosure. For exemplary purposes and without limiting the scope of the present disclosure, it is assumed in the following that a UE (e.g. UE 100 as depicted FIG. 1 or UE 300 as depicted in FIG. 3) goes through a decision procedure that triggers a request (e.g. a re-configuration request) to be transmitted to the gNB (e.g. network node 200 as depicted in FIG. 2).

At block 801, the UE receives one or multiple resource sets from the gNB during which it has to perform the SRS transmission on some or all of its RX antennas (which is e.g. transmitting at least one uplink reference signal through at least one respective antenna port of the UE). At block 802, the power of the SRS transmission (e.g. the required transmission power) on the specific RX antenna is calculated. At block 803, the UE checks if it can deliver the required SRS transmission power. In particular, the UE determines that sufficient power headroom is available if the following inequation is met:

$$P_{srs} + IL \leq P_{max},$$

with $P_{srs}$ denoting a required SRS transmission power (e.g. the first required transmission power), $P_{max}$ denoting a maximum output power and IL denoting an insertion loss for the respective antenna (e.g. the at least one first insertion loss). At block 804, the UE checks if masking permission has already been granted by an earlier request from the UE or just granted by default by gNB. If the result at block 804 is positive, the UE may for example lower the required transmission power of the SRS by masking the SRS resources. The UE shall mask the SRS resources until it can deliver the correct transmission power for the symbols containing the SRS resources. However, the masking may not exceed a maximum masking level set by the gNB. Subsequently at block 806, the UE transmits the SRS with the required transmission power $P_{srs}$ increased by IL (e.g. if sufficient masking has been permitted) or with $P_{max}$ (e.g. if a maximum permitted masking level has been reached before sufficient masking may be achieved) and potentially informs the gNB on the remaining uncompensated IL if any that would be required to meet $P_{srs}$. If the result at block 804 is negative, the UE checks at block 807 if masking permission has already been requested. If not, a masking permission is requested by the UE by proceeding to block 808, otherwise the procedure continues with block 806.

More detailed, exemplary explanations on the actions in the exemplary decision procedure illustrated in FIG. 8 are given in the following:

Block 801:

The UE is configured by the gNB, with the higher layer parameter usage in SRS-ResourceSet set as 'antennaSwitching'. The gNB may use the UE capabilities to determine which SRS resource sets that are most appropriate to compensate for potential insertion loss issues during SRS antenna switching. As an example, the capability parameter, supportedSRS-TxPortSwitch, indicates the UE antenna switching capability, e.g. 'xTyR' meaning that the UE is capable of SRS transmission on 'x' antenna ports over total of 'y' antennas. In addition, the active band may also be considered since the insertion loss will increase with higher frequencies.

Block 802:

The antenna specific required transmission power $P_{srs}$ is derived by the following equation (as e.g. in the 3GPP TS 38.213, section 7.3):

$$P_{srs,b,f,c}(i, q_s, l) = \min \begin{cases} P_{Cmax,f,c}(i) \\ P_{O_{srs}b,f,c}(q_s) + 10\log_{10}(2^{\mu} \cdot M_{srs,b,f,c}(i) + \\ \alpha_{srs,b,f,c}(q_s) \cdot PL_{b,f,c}(q_d) + h_{b,f,c}(i, l)) \end{cases} \text{[dBm]}$$

wherein $P_{srs,b,f,c}(i, q_s, l)$ is the required transmission power;

$P_{Cmax,f,c}(i)$ is the maximum output power available at the UE;

$P_{O_{srs},b,f,c}(q_s)$ is provided by $P_0$ (nominal transmit power per resource block) for active UL bandwidth part (BWP) b of carrier f of serving cell c and SRS resource set $q_s$ provided by SRS-ResourceSet and SRS-ResourceSetId;

$2^{\mu}$ accounts for the halving of the OFDM symbol duration with increased numerology;

$M_{srs,b,f,c}(i)$ is a SRS bandwidth expressed in number of resource blocks for SRS transmission occasion i;

$\alpha_{srs,b,c}(q_s)$ is provided by a for active UL BWP b of carrier f of serving cell c and SRS resource set $q_s$;

$PL_{b,f,c}(q_d)$ is a downlink pathloss estimate in dB calculated by the UE; and $h_{b,f,c}(i, l)=f_{b,f,c}(i, l)$, wherein $f_{b,f,c}(i, l)$ is the current PUSCH power control adjustment state.

The minimum required PH is equal to the additional IL for the RX antenna port through which the SRS signal is to be transmitted, compared to the loss for TX at the normal TX antenna port.

The IL for each RX antenna port needs to be known by the UE, which may for example involve calibration during UE production or characterization of the IL during UE development or operation. Since the IL may depend on the frequency at which the UE operates, the knowledge about IL needs also to contain information about the frequency dependency. The information can be stored in the UE in non-volatile memory, which can then be accessed when needed during RRC connected mode.

Block 803:

The UE evaluates if it can deliver the required SRS transmission power.

Block 804:

The UE checks if masking permission has already been granted by an earlier request from the UE or just granted by default by gNB.

Block 805:

$P_{srs}$ is calculated per antenna. It may be proposed to reduce $P_{srs}$ by reducing the number of SRS resource blocks to be transmitted in a given OFDM symbol, which equals reducing $M_{srs,b,f,c}(i)$. As can be deducted from the equation above for $P_{srs}$, every halving of $M_{srs,b,f,c}(i)$ will reduce $P_{srs}$ by ~3 dB. The UE shall mask the resources until it can deliver the correct transmission power for the symbols containing the SRS resources. However, the masking cannot exceed the maximum masking level set by the gNB.

Block 806:

The SRS is transmitted with transmission power $P=P_{srs}+IL$ if $P \leq P_{max}$, otherwise the SRS is transmitted with $P_{max}$. In the latter case, the UE may inform the gNB about the remaining uncompensated IL. The gNB can take this into account when performing the channel sounding, but in addition this may trigger the gNB to update the SRS resource sets given to the UE, if it is able to offer resource sets with lower requirement for $P_{srs}$. An example could be a resource set where half of the frequency resources are dedicated to this UE per OFDM symbol, but instead the resources are distributed across double as many OFDM symbols.

For example, if the UE is not able to fully compensate for the IL, despite applying masking and/or the mentioned SRS resource distribution schemes, it may be suggested to inform the gNB about the missing IL compensation such that the gNB can take this into consideration for the channel sounding. It may be allowed to transmit the SRS resources with up to 3 dB less power than $P_{srs}$ without informing the gNB, however then the gNB cannot compensate for the missing power.

In other examples, the UE may autonomously mask some resources and the gNB may be able to detect it on its own by observing no power in the masked SRS resources, since the masking is done by masking every n SRS resource.

Block 807:

Since the UE has still not acquired permission to perform masking, it will send a request to gNB asking to be granted this permission (sending this request may e.g. correspond to action 6 in FIGS. 6 and 7). If the network does grant permission to perform masking, it can send an RRC reconfiguration with the updated SRS configuration sets as well as the maximum allowed masking.

Regarding the maximum masking limit there are two options:

1) The UE may send a minimum wanted masking percentage. If the gNB cannot accommodate/permit this, it can reject.
2) The UE request the masking permission and the gNB gives the maximum masking it will permit.

If the allowed masking is insufficient, the UE may transmit with lower transmission power than required and potentially inform the gNB about the missing or remaining uncompensated IL. If the difference becomes above a certain threshold (e.g. 6 dB), the SRS transmission may become useless for gNB which instead may do channel sounding by estimating. Therefore, the UE may decide to drop the SRS transmission in this case.

In summary, according to the exemplary embodiment according to the present disclosure described above, a standardized signaling support between the UE and the gNB is proposed to allow the UE to request masking permission of the SRS resources in order to benefit from the SRS antenna switching feature. For example, the request for SRS masking permission (e.g. an explicit masking pattern or a percentage of masked resources) is triggered if the UE cannot fully compensate for the insertion loss by increasing the transmission power equivalently to the IL. If for example masking permission is granted by the gNB, the UE may reduce the required TX power by masking the SRS resources for each SRS symbol.

Figure 9:
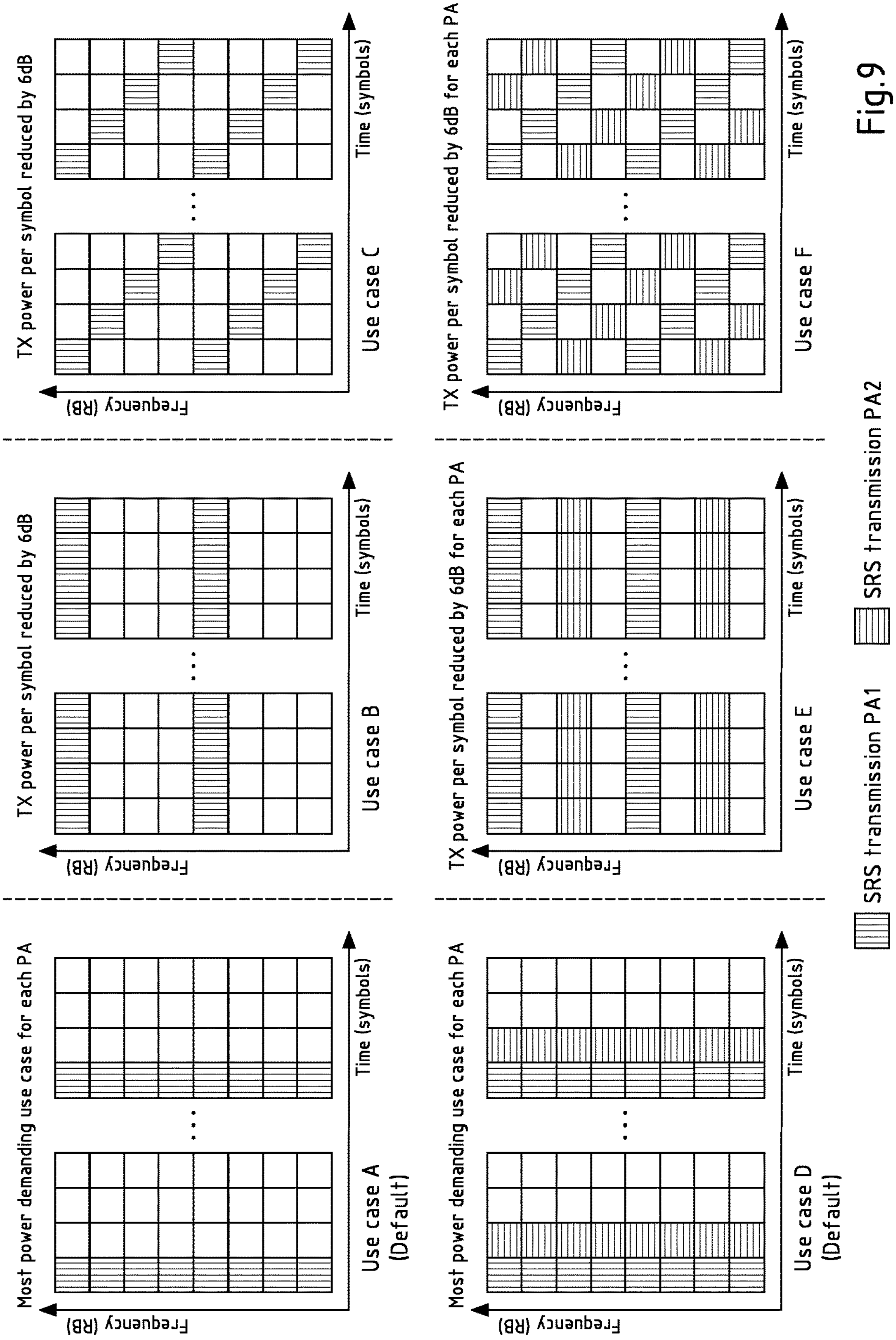
FIG. 9 is a schematic illustration of exemplary embodiments for modifying sets of resource blocks according to the present disclosure.

FIG. 9 is a schematic illustration of exemplary embodiments for modifying sets of resource blocks according to the present disclosure. For example, spreading SRS resources across multiple SRS symbols may allow for reducing a required transmission power for a given SRS symbol.

According to the exemplary illustration in FIG. 9, use case A is before masking, use case B is with masking of 75% of the SRS resources in use case A, but also with 4 times repetition. Use case C also applies masking, but instead of repeating the first SRS symbol, it is offsetting the SRS resources in the frequency domain for each symbol. This ensures that the gNB will receive sounding information on all the resource blocks as in use case A, but with 6 dB extra transmission power (every halving of the SRS resources for a given OFDM symbol reduces the required SRS transmission power with 3 dB).

In an exemplary case where the UE has multiple PAs, for example due to UL MIMO support, then the SRS resources can be interleaved between the available PA's, which would lower the required transmission power of each of the PA's, but meaning that the PA's would have to transmit over more symbols (see use cases D-F). For example, the two PA's can operate in the same OFDM symbols, but transmit on different resources in the frequency domain. Thereby the transmit bandwidth of each PA is reduced and hence the required transmission power for each symbol. This may require that the PA's are transmitting over more OFDM symbols.

For example, a priority of the schemes illustrated in use case A-F may be the following:

1. Use case C or F depending on the number of PA's. These schemes offer the full channel sounding granularity over frequencies and with less TX power requirements per symbol compare to use case A or D.
2. Use case B or E if it is not possible to schedule the resources as in use case C and F, e.g. due to conflicts with the SRS from other UE's, then use case B or E can be used, since these use cases requires less power consumption compared to use case A and D.
3. Use case A and D. If the required transmission power cannot be met, and masking is not allowed, the UE must do best effort and transmit the SRS with its maximum power. This may for example trigger informing the gNB on the missing compensation of IL.

Figure 10:
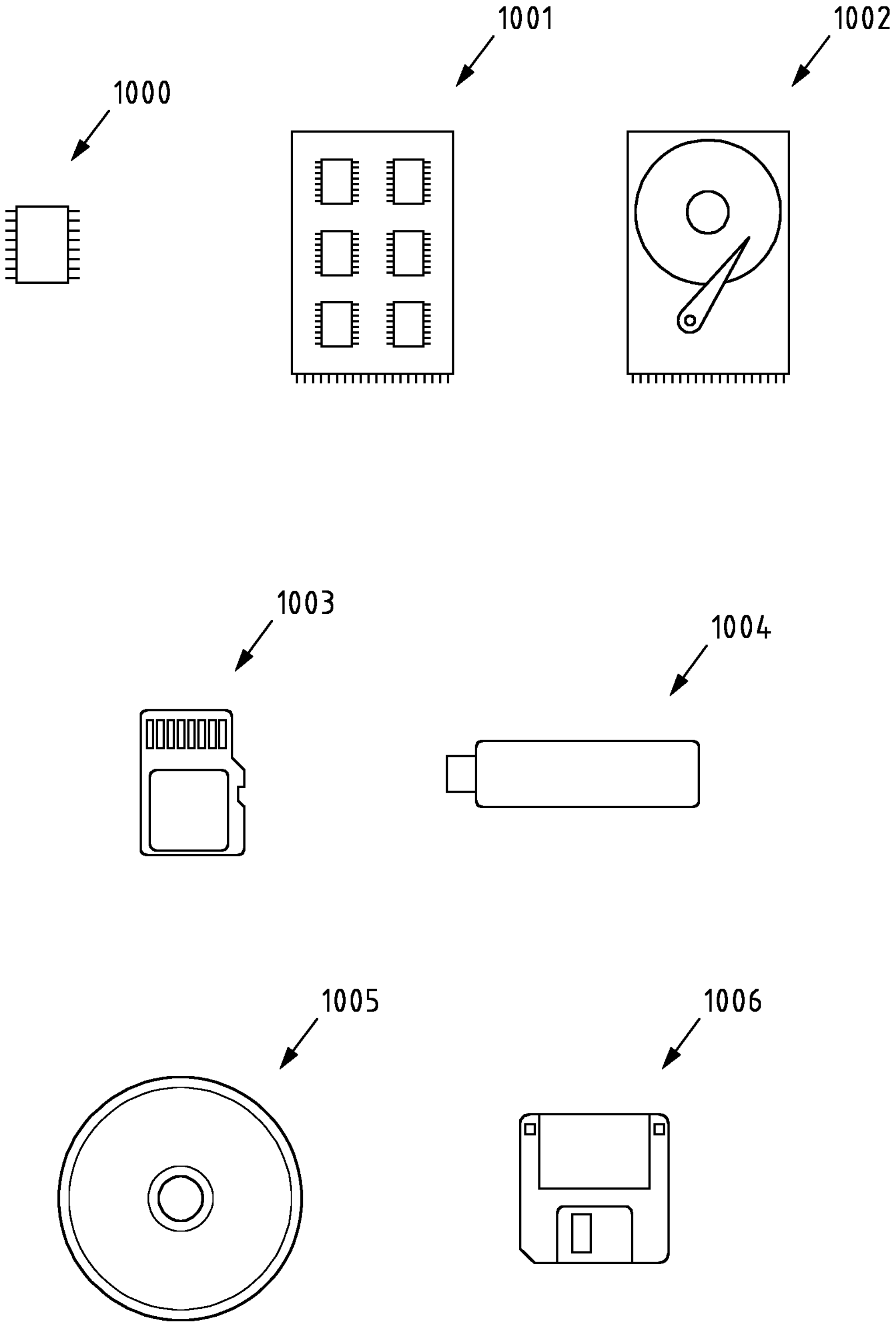
FIG. 10 is a schematic illustration of examples of tangible and non-transitory computer-readable storage media.

FIG. 10 is a schematic illustration of examples of tangible and non-transitory computer-readable storage media according to the present disclosure that may for example be used to implement memory 102 of FIG. 1 or memory 202 of FIG. 2. To this end, FIG. 10 displays a flash memory 1000, which may for example be soldered or bonded to a printed circuit board, a solid-state drive 1001 comprising a plurality of memory chips (e.g. Flash memory chips), a magnetic hard drive 1002, a Secure Digital (SD) card 1003, a Universal Serial Bus (USB) memory stick 1004, an optical storage medium 1005 (such as for example a CD-ROM or DVD) and a magnetic storage medium 1006.

With respect to the above described examples and exemplary embodiments according to the present disclosure and without limiting the scope of the present disclosure, at least some advantages of examples and exemplary embodiments according to the present disclosure may be described as follows:

A network node may enable a UE to provide an SRS signal with equal radiated transmission power for antenna switching (e.g. on up to 4 or 8 antennas).

A UE is enabled to actually compensate for the loss—at least partially and in some cases—by dynamically signaling to the network node preferred SRS masking patterns.

The proposed solution is applicable in e.g. an FR1 context to combat a static insertion loss including SRS configuration adaptation and UE power headroom mechanisms.

A reporting method is proposed from the UE to the network node for mitigating the insertion loss related to SRS antenna switching for antennas with high insertion loss.

It is proposes to standardize signaling support between the UE and the network node (e.g. a gNB) to allow the UE for requesting masking permission of the SRS resources in order to benefit from an 8 antennas SRS switching feature.

The UE may be able to indicate to network node its preferred SRS configuration to the gNB (e.g. UCI or MAC CE).

A method is provided for mitigating the throughput drop resulting from the SRS switching loss during SRS antenna switching and thereby allows for better channel sounding. Better channel sounding in the end means higher throughput for the user. If for example the SRS switching loss increases from 3 dB to 6 dB the throughput drops in 4×4 DL MIMO more than 5% from no loss situation. With the proposed solution, this throughput drop of 5% would be avoided.

With the proposed solution, the network node does not need to estimate the precoding from different antenna ports, but it can use the correct antenna ports and receive/combine/decode the signal with enough power to optimize DL MIMO.

The more UE antennas and the higher the insertion loss, the higher the gain of the proposed approach.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to sections of processor(s)/software (including digital signal processor(s)), software, and memory(ies) that work together to cause an apparatus, such as a mobile phone, to perform various functions) and (c) to circuits, such as a microprocessor(s) or a section of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 101 and 201 of FIGS. 1 and 2, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that the embodiments disclosed herein are only exemplary, and that any feature presented for a particular exemplary embodiment may be used with any aspect of the present disclosure on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

LIST OF ABBREVIATIONS

UE User equipment
gNB Next generation Node B
NR New radio
UL Uplink
DL Downlink
MIMO Multiple Input Multiple Output
SRS Sounding reference signal
RB Resource Block
MCS Modulation coding scheme
TRX Transmit and/or Receive
RX Receive
TX Transmit
PA Power amplifier
IL Insertion Loss
RRC Radio resource control
MAC Media access control
BWP Bandwidth part
PUSCH Physical Uplink Shared Channel
PCB Printed circuit board
BLE Bluetooth Low Energy
WLAN Wireless Local Area Network

The invention claimed is:

1. An apparatus comprising at least one processor and at least one memory including computer program code, the at least one memory and the computer program code configured to, with the at least one processor, cause the apparatus at least to perform:

receiving, from a network node, a first configuration for at least one uplink reference signal to be transmitted through at least one respective antenna port of the apparatus, wherein the first configuration comprises a first set of resource blocks over which the at least one uplink reference signal is to be transmitted;

determining whether sufficient power headroom is available at the apparatus to compensate for at least one first insertion loss to be incurred within the apparatus by the at least one respective uplink reference signal transmitted according to the first configuration;

if it is determined that sufficient power headroom to compensate for the at least one first insertion loss is not available, transmitting, to the network node, a re-configuration request for the at least one uplink reference signal;

receiving, from the network node in response to the re-configuration request, a second configuration for the at least one uplink reference signal associated with a second set of resource blocks over which the at least one uplink reference signal is to be transmitted; and transmitting, to the network node, the at least one uplink reference signal according to the second configuration through the at least one respective antenna port, wherein a first required transmission power for the at least one uplink reference signal according to the first configuration is higher than a second required transmission power for the at least one uplink reference signal according to the second configuration.

2. The apparatus according to claim 1, wherein sufficient power headroom is available at the apparatus to compensate for at least one second insertion loss incurred within the apparatus by the at least one respective uplink reference signal transmitted according to the second configuration.

3. The apparatus according to claim 1, wherein the determining whether sufficient power headroom is available at the apparatus to compensate for the at least one first insertion loss is at least based on a first required transmission power for the at least one uplink reference signal according to the first configuration, a maximum output power, and the at least one first insertion loss.

4. The apparatus according to claim 1, wherein the apparats is further caused to at least perform one or more of:

determining a first required transmission power for the at least one uplink reference signal according to the first configuration;

determining a second required transmission power for the at least one uplink reference signal according to the second configuration;

obtaining or determining a maximum output power; or obtaining or determining the at least one first insertion loss or the at least one second insertion loss.

5. The apparatus according to claim 1, wherein the re-configuration request for the second configuration comprises one or more of:

information indicating that sufficient power headroom to compensate for the at least one first insertion loss is not available;

information indicative of the second set of resource blocks;

a request for modifying the first set of resource blocks; or a request for applying the second set of resource blocks.

6. The apparatus according to claim 1, wherein the second set of resource blocks is a strict subset of the first set of resource blocks and is obtained by masking one or more resource blocks in the first set of resource blocks as being excluded for transmission of the at least one uplink reference signal, or by enabling one or more resource blocks in the first set of resource blocks as being allowed for transmission of the at least one uplink reference signal.

7. The apparatus according to claim 1, wherein the apparatus is further caused to at least perform:

transmitting, to the network node, the at least one uplink reference signal according to the first configuration through the at least one respective antenna port, if it is determined that sufficient power headroom to compensate for the at least one first insertion loss is available.

8. The apparatus according to claim 1, wherein sufficient power headroom at the apparatus to compensate for at least one second insertion loss incurred within the apparatus by the at least one respective uplink reference signal transmitted according to the second configuration is not available, and wherein the apparatus is further caused to at least perform:

transmitting, to the network node, in addition to the at least one uplink reference signal according to the second configuration, information indicating at least one uncompensated second insertion loss.

9. A method comprising, by a user equipment:

receiving, from a network node, a first configuration for at least one uplink reference signal to be transmitted through at least one respective antenna port of the user equipment, wherein the first configuration comprises a first set of resource blocks over which the at least one uplink reference signal is to be transmitted;

determining whether sufficient power headroom is available at the user equipment to compensate for at least one first insertion loss to be incurred within the user equipment by the at least one respective uplink reference signal transmitted according to the first configuration;

if it is determined that sufficient power headroom to compensate for the at least one first insertion loss is not available, transmitting, to the network node, a re-configuration request for the at least one uplink reference signal;

receiving, from the network node in response to the re-configuration request, a second configuration for the at least one uplink reference signal associated with a second set of resource blocks over which the at least one uplink reference signal is to be transmitted; and transmitting, to the network node, the at least one uplink reference signal according to the second configuration through the at least one respective antenna port, wherein a first required transmission power for the at least one uplink reference signal according to the first configuration is higher than a second required transmission power for the at least one uplink reference signal according to the second configuration.

10. The method according to claim 9, wherein sufficient power headroom is available at the user equipment to compensate for at least one second insertion loss incurred within the user equipment by the at least one respective uplink reference signal transmitted according to the second configuration.

11. The method according to claim 9, wherein the determining whether sufficient power headroom is available at the user equipment to compensate for the at least one first insertion loss is at least based on a first required transmission power for the at least one uplink reference signal according to the first configuration, a maximum output power, and the at least one first insertion loss.

12. The method according to claim 9, wherein the method further comprises, by the user equipment, one or more of:

determining a first required transmission power for the at least one uplink reference signal according to the first configuration;

determining a second required transmission power for the at least one uplink reference signal according to the second configuration;

obtaining or determining a maximum output power; or obtaining or determining the at least one first insertion loss or the at least one second insertion loss.

13. The method according to claim 9, wherein the re-configuration request for the second configuration comprises one or more of the following:

information indicating that sufficient power headroom to compensate for the at least one first insertion loss is not available;

information indicative of the second set of resource blocks;

a request for modifying the first set of resource blocks; or a request for applying the second set of resource blocks.

14. An apparatus comprising at least one processor and at least one memory including computer program code, the at least one memory and the computer program code configured to, with the at least one processor, cause the apparatus at least to perform:

transmitting, to a user equipment, a first configuration for at least one uplink reference signal to be transmitted through at least one respective antenna port of the user equipment, wherein the first configuration comprises a first set of resource blocks over which the at least one uplink reference signal is to be transmitted;

receiving, from the user equipment, a re-configuration request for the at least one uplink reference signal, if it is determined by the user equipment that sufficient power headroom to compensate for at least one first insertion loss to be incurred within the user equipment by the at least one respective uplink reference signal transmitted according to the first configuration is not available at the user equipment;

transmitting, to the user equipment in response to the re-configuration request, a second configuration for the at least one uplink reference signal associated with a second set of resource blocks over which the at least one uplink reference signal is to be transmitted; and receiving, from the user equipment, the at least one uplink reference signal transmitted according to the second configuration through the at least one respective antenna port, wherein a first required transmission power for the at least one uplink reference signal according to the first configuration is higher than a second required transmission power for the at least one uplink reference signal according to the second configuration.

15. The apparatus according to claim 14, wherein the re-configuration request for the second configuration comprises one or more of:

information indicating that sufficient power headroom to compensate for the at least one first insertion loss is not available;

information indicative of the second set of resource blocks;

a request for modifying the first set of resource blocks; or a request for applying the second set of resource blocks.

16. The apparatus according to claim 14, wherein the second set of resource blocks is a strict subset of the first set of resource blocks and is obtained by masking one or more resource blocks in the first set of resource blocks as being excluded for transmission of the at least one uplink reference signal, or by enabling one or more resource blocks in the first set of resource blocks as being allowed for transmission of the at least one uplink reference signal.

17. The apparatus according to claim 14, wherein the second configuration comprises one or more of the following:

information indicative of the second set of resource blocks;

a permission for modifying the first set of resource blocks;

a permission for applying the second set of resource blocks.

* * * * *